(12) United States Patent
Atwal et al.

(10) Patent No.: US 7,640,348 B2
(45) Date of Patent: Dec. 29, 2009

(54) SYSTEM AND METHOD OF MANAGING ACCESS TO WEB SERVICES

(75) Inventors: Amar Atwal, Ottawa (CA); Joseph Chiu, Ottawa (CA); Frederic LeBel, Ottawa (CA); Stephen Mereu, Ottawa (CA); Rick Mutzke, Ottawa (CA); Raul Rupsingh, Brampton (CA); Matt Schnarr, Ottawa (CA); Don Slaunwhite, Ottawa (CA); Ramesh Subramanian, Gloucester (CA)

(73) Assignee: Corel Corporation (CA)

( * ) Notice: Subject to any disclaimer, the term of this patent is extended or adjusted under 35 U.S.C. 154(b) by 453 days.

(21) Appl. No.: 10/252,871

(22) Filed: Sep. 23, 2002

(65) Prior Publication Data

US 2003/0061404 A1 Mar. 27, 2003

Related U.S. Application Data

(60) Provisional application No. 60/324,191, filed on Sep. 21, 2001.

(51) Int. Cl.
*G06F 15/16* (2006.01)
(52) U.S. Cl. .................. 709/229; 709/220; 709/245; 370/254; 707/10
(58) Field of Classification Search ............. 709/203, 709/219, 226, 221, 238, 223, 220, 227, 229, 709/224, 228, 245; 370/254, 389; 455/7; 713/201, 203; 710/301; 707/1, 10
See application file for complete search history.

(56) References Cited

U.S. PATENT DOCUMENTS

| | | | |
|---|---|---|---|
| 5,678,041 A * | 10/1997 | Baker et al. ............. 707/9 |
| 5,815,665 A | 9/1998 | Teper et al. ......... 395/200.59 |
| 5,845,267 A | 12/1998 | Ronen ...................... 705/40 |
| 5,948,054 A * | 9/1999 | Nielsen ................... 709/200 |
| 6,032,175 A * | 2/2000 | Fletcher et al. ......... 709/200 |
| 6,035,281 A | 3/2000 | Crosskey et al. ........... 705/14 |
| 6,098,093 A | 8/2000 | Bayeh et al. ............ 709/203 |
| 6,141,758 A | 10/2000 | Benantar et al. ........ 713/201 |
| 6,173,407 B1 | 1/2001 | Yoon et al. .............. 713/201 |
| 6,178,457 B1 | 1/2001 | Pitchford et al. ........ 709/228 |
| 6,195,682 B1 | 2/2001 | Ho et al. ................ 709/203 |

(Continued)

FOREIGN PATENT DOCUMENTS

WO    WO 00/65773    11/2000

(Continued)

OTHER PUBLICATIONS

"Developer Works: Web Services: Articles—Title" *IBM Developer Works*, pp. 1-2, Sep. 2001.

(Continued)

*Primary Examiner*—Khanh Q Dinh
(74) *Attorney, Agent, or Firm*—Hayes Soloway P.C.

(57) ABSTRACT

A gateway module for managing functionality for one or more web services is provided. The web services gateway module comprises a client application interface unit for receiving communication from a client application over a standard protocol, a communication processor for processing the communication for a web service, and a web services interface unit for delegating the processed communication to the web service.

41 Claims, 16 Drawing Sheets

U.S. PATENT DOCUMENTS

| | | | |
|---|---|---|---|
| 6,212,192 B1 | 4/2001 | Mirashrafi et al. | 370/401 |
| 6,216,173 B1 | 4/2001 | Jones et al. | 709/302 |
| 6,233,577 B1 | 5/2001 | Ramasubramani et al. | 707/9 |
| 6,233,604 B1 | 5/2001 | Van Horne et al. | 709/203 |
| 6,286,104 B1 | 9/2001 | Buhle et al. | 713/201 |
| 6,292,827 B1 | 9/2001 | Raz | 709/217 |
| 6,304,915 B1 | 10/2001 | Nguyen et al. | 709/250 |
| 6,311,207 B1 | 10/2001 | Mighdoll et al. | 709/203 |
| 6,317,786 B1 | 11/2001 | Yamane et al. | 709/224 |
| 6,338,046 B1 | 1/2002 | Saari et al. | 705/34 |
| 6,338,089 B1 | 1/2002 | Quinlan | 709/227 |
| 6,343,284 B1 | 1/2002 | Ishikawa et al. | 705/67 |
| 6,343,323 B1 | 1/2002 | Kalpio et al. | 709/229 |
| 6,345,298 B1 | 2/2002 | Moriya | 709/228 |
| 6,351,771 B1 | 2/2002 | Craddock et al. | 709/227 |
| 6,356,971 B1 * | 3/2002 | Katz et al. | 710/301 |
| 6,374,078 B1 * | 4/2002 | Williams et al. | 455/7 |
| 6,434,619 B1 * | 8/2002 | Lim et al. | 709/229 |
| 6,684,336 B1 * | 1/2004 | Banks et al. | 709/227 |
| 6,751,652 B1 * | 6/2004 | Thomas | 709/204 |
| 6,779,004 B1 * | 8/2004 | Zintel | 709/227 |
| 6,885,861 B2 * | 4/2005 | Koskelainen | 455/414.2 |
| 6,922,685 B2 * | 7/2005 | Greene et al. | 707/1 |
| 6,970,939 B2 * | 11/2005 | Sim | 709/236 |
| 7,022,905 B1 * | 4/2006 | Hinman et al. | 84/609 |
| 2001/0007127 A1 | 7/2001 | Staring | 713/160 |
| 2001/0027449 A1 | 10/2001 | Wright | 705/412 |
| 2002/0007376 A1 | 1/2002 | Popp et al. | 707/513 |
| 2002/0010776 A1 | 1/2002 | Lerner | 709/225 |
| 2002/0010803 A1 | 1/2002 | Oberstein et al. | 709/318 |
| 2002/0013849 A1 | 1/2002 | Schweitzer et al. | 709/227 |
| 2002/0016843 A1 | 2/2002 | Schweitzer et al. | 709/227 |
| 2002/0016922 A1 | 2/2002 | Richards et al. | 713/200 |
| 2002/0026519 A1 | 2/2002 | Itabashi et al. | 709/229 |
| 2002/0029256 A1 * | 3/2002 | Zintel et al. | 709/218 |
| 2002/0065907 A1 * | 5/2002 | Cloonan et al. | 709/223 |
| 2002/0107949 A1 * | 8/2002 | Rawson, III | 709/223 |

FOREIGN PATENT DOCUMENTS

| | | |
|---|---|---|
| WO | WO 01/13259 | 2/2001 |

OTHER PUBLICATIONS

"Developer Works: Web Services: Articles, Columns & Tips" *IBM Developer Works*, pp. 1-7, Nov. 2001.

"Developer Works: Web Services: Articles, Columns & Tips-Title" *IBM Developer Works*, pp. 1-11, Dec. 2002.

"Web services provisioning" Polan, *IBM Developer Works*, pp. 1-8, Jan. 2002.

"Advancing SOAP interoperability" Hong, *IBM Developer Works*, pp. 1-5, Jun. 2001.

"An overviw of the Web Services Inspection Language" Brittenham, *IBM Developer Works*, pp. 1-20, Nov. 2001.

"The Advertisement and Discovery of Services (ADS) protocol for Web services Simplifying the announcement of available Web services to inquiring software agents" Nagy et al. *IBM Developer Works*, pp. 1-6, Oct. 2000.

"Applying Web services to the application service provider environment An example of Web services applied to e-business" Flurry, *IBM Developer Works*, pp. 1-9. Jan. 2001.

"Applying Web Services to the Application Service Provider Environment, Part 2 An Example of Web Services Applied to e-Business" Flurry, *IBM Developer Works*, pp. 1-10, Jan. 2001.

"Web Service networks" Truelove, *IBM Developer Works*, pp. 1-4, Oct. 2001.

"Energize e-business with Web services from the IBM WebSphere software platform" developerWorks staff, *IBM Developer Works*, pp. 1-4, Nov. 2000.

"IBM's Web Services architecture debuts" Fisco, *IBM Developer Works*, pp. 1-8, Sep. 2000.

"Myths and misunderstandings surrounding SOAP" Cohen, *IBM Developer Works*, pp. 1-4, Sep. 2001.

"Performance testing SOAP-based applications" Cohen, *IBM Developer Works*, pp. 1-9, Nov. 2001.

"Programming XML and Web services in TCL, Part 1: An initial primer" Laird, *IBM Developer Works*, pp. 1-4, Apr. 2001.

"The Python Web services Developer, Part 1 The World of Python Web services" Olson et al., *IBM Developer Works*, pp. 1-5, Jan. 2001.

"The Python Web Services Develper, Part 2 Web Services Software Repository, Part 1" Olson et al., *IBM Developer Works*, pp. 1-4, Mar. 2001.

"The Python Web services developer, Part 3: Web services software repository, Part 2" Olson et al., *IBM Developer Works*, pp. 1-8, Apr. 2001.

"The Python Web services developer, Part 4: Web services software repository, Part 3" Olson et al, *IBM Developer Works*, pp. 1-9, Jul. 2001.

"The Python Web services developer: Python SOAP libraries" Olson et al., *IBM Developer Works*, pp. 1-8, Sep. 2001.

"Repurposing CGI applications with SOAP" Johnston, *IMB Developer Works*, pp. 1-10, May 2001.

"The role of private UDDI nodes in Web services, Part 1: Six species of UDDI" Graham, *IBM Developer Works*, pp. 1-4, May 2001.

"SMS: Case study of a Web services deployment" Laird, *IBM Developer Works*, pp. 1-4, Aug. 2001.

"SOAP security extentions: digital signature" Hada, *IBM Developer Works*, pp. 1-6, Aug. 2001.

"Supercharging WSDL with RDF" Ogbuji, *IBM Developer Works*, pp. 1-5, Nov. 2000.

"The WS-Inspection and UDDI Relationship" Nagy et al. *IBM Developer Works*, pp. 1-4, Nov. 2001.

"UDDI4J: Matchmaking for Web services" Tidwell, *IBM Developer Works*, pp. 1-4, Jan. 2001.

"Understanding WSDL in a UDDI registry, Part 1" Brittenham et al., *IBM Developer Works*, pp. 1-12, Sep. 2001.

"Understanding WSDL in a UDDI registry, Part 2" Brittenham, *IBM Developer Works*, pp. 1-22, Sep. 2001.

"Using SOAP::Lite with Perl" Johnston, *IBM Developer Works*, pp. 1-5, May 2001.

"Using WSDL in SOAP applications An introduction to WSDL for SOAP programmers" Ogbuji, *IBM Developer Works*, pp. 1-6, Nov. 2000.

"Using XML-RPC for Web services: Getting started with XML-RPC in Perl" Johnston, *IBM Developer Works*, pp. 1-6, Mar. 2001.

"Using XML-RPC for Web services: XML-RPC Middleware" Johnston, *IBM Developer Works*, pp. 1-6, Mar. 2001.

"Web services and XML technologies CD" staff, *IBM Developer Works*, pp. 1-4, Sep. 2001.

"Web Services architecture overview The next stage of evolution for e-business" IBM Web Services Architecture Team, *IBM Developer Works*, pp. 1-8, Sep. 2000.

"Web services architect, Part 1: An introduction to dynamic e-business" Gisolfi, *IBM Developer Works*, pp. 1-6, Apr. 2001.

"Web services architect, Part 2: Models for dynamic e-business" Gisolfi, *IBM Developer Works*, pp. 1-4, Apr. 2001.

"Web services architect, Part 3: Is Web services the reincarnation of COBRA?" Gisolfi, *IBM Developer Works*, pp. 1-7, Jul. 2001.

"The Web services (r)evolution, Part 4 Web Services Description Language (WSDL)" Glass, *IBM Developer Works*, pp. 1-5, Feb. 2001.

"Web services architect, Part 5: Inhibitors to fee-based Web services" Gisolfi, *IBM Developer Works*, pp. 1-3, Oct. 2001.

"The Web services architect: Catalysts for fee-bsed Web services" Gisolfi, *IBM Developer Works*, pp. 1-6, Nov. 2001.

"Web services checkpoint" Smith, *IBM Developer Works*, pp. 1-2, Nov. 2000.

"Web services improves employee benefits processing" Whitlock et al., *IBM Developer Works*, pp. 1-6, Oct. 2001.

"The Web services insider, Part 10: Digging into the issues" Snell, *IBM Developer Works*, pp. 1-4, Nov. 2001.

"Web services insider, Part 1: Reflections on SOAP" Snell, *IBM Developer Works*, pp. 1-5, Apr. 2001.

"The Web services insider, Part 2: A summary of the W3C Web Services Workshop" Snell, *IBM Developer Works*, pp. 1-4, Apr. 2001.

"The Web services insider, Part 3: Apache and Microsoft—playing nice together" Snell, *IBM Developer Works*, pp. 1-6, May 2001.

"The Web services insider, Part 4: Introducing the Web Services Flow Language" Snell, *IBM Developer Works*, pp. 1-6, Jun. 2001.

"The Web services insider, Part 5: Getting into the flow" Snell, *IBM Developer Works*, pp. 1-6, Jul. 2001.

"The Web services insider, Part 6: Assuming responsibility" Snell, *IBM Developer Works*, pp. 1-5, Jul. 2001.

"Web services insider, Part 7: WSFL and recursive composition" Snell, *IBM Devdoper Works*, pp. 1-6, Jul. 2001.

"The Web services insider, Part 8: Soapy decisions" Davis, *IBM Developer Works*, pp. 1-5, Aug. 2001.

"Web services insider, Part 9: Digging into the issues" Snell et al., *IBM Developer Works*, pp. 1-4, Sep. 2001.

"Web service invocation sans SOAP" Mukhi, *IBM Developer Works*, pp. 1-6, Sep. 2001.

"Web service invocation sans SOAP, Part 2: The architecture of Web Service Invocation Framework" Mukhi et al., *IBM Developer Works*, pp. 1-8, Sep. 2001.

"The Web services (r)evolution: Part 1" Glass, *IBM Developer Works*, pp. 1-3, Nov. 2000.

"The Web services (r)evolution: Part 2" Glass, *IBM Developer Works*, pp. 1-10, Dec. 2000.

"The Web services (r)evolution: Part 3" Glass, *IBM Developer Works*, pp. 1-9, Jan. 2001.

"The Web services (r)evolution: Part 4" Glass, *IBM Developer Works*, pp. 1-11, Feb. 2001.

"The Web Services TestArea" Shah, *IBM Developer Works*, pp. 1-4, May 2001.

"WSDL processing with XSLT" Ogbuji, *IBM Developer Works*, pp. 1-4, Nov. 2000.

"Authentication and Authorization" Kirtland, msdn.microsoft.com, pp. 1-8, Feb. 2001.

"Favorites Service Overview" Kritland, msdn.microsoft.com, pp. 1-5, Updated Aug. 2001.

"Metering and accounting for Web services" Kuebler et al., *IBM Developer Works*, pp. 1-7, Jul. 2001.

"Web Services Interoperability and SOAP" Ballinger, msdn.microsoft.com, pp. 1-3, May 2001.

"Oracle Dynamic Services: Oracle's Web Services Framework" Srivastava, *Oracle Corporation Position Pater of Web Services* pp. 1-5, Nov. 2001.

"Simple Object Access Protocol (SOAP) 1.1" Box et al., pp. 1-35, May 2000.

Timothy M. Chester, Cross-Platform Integration with XML and SOAP, IT Pro, pp. 26-34, Sep./Oct. 2001.

Frank P. Coyle, Breathing Life into Legacy, IT Pro, pp. 1724, Sep./Oct. 2001.

* cited by examiner

SYSTEM AND METHOD OF MANAGING ACCESS TO WEB SERVICES

PRIORITY

This patent application claims priority from U.S. patent application No. Ser. 60/324,191 entitled "Web Services Infrastructure", Atwal et. al., filed Sep. 21, 2001.

FIELD OF THE INVENTION

This invention relates to an infrastructure for managing functionality for web services. In particular, the invention relates to a web services gateway.

BACKGROUND OF THE INVENTION

Software developers wish to provide programmatic functionality over the Internet through the creation of web services. These web services provide some valuable technology in which the developer has expertise. A web service is often deployed in such a way that the user of the web service has a direct connection with a server hosing the web service. For example, if there are ten servers hosting different web services, then there are ten "connection points" into the different web services. This makes addition of web server independent common features, such as application-level authentication, authorization and transaction logging tedious, time consuming and prone to errors at the integration layer.

FIG. 1 shows an example of a standard web service deployment environment. The standard web service deployment environment comprises an end user application 10, web services providers 20, and connections 30. The web services providers 20 have web services WS1 to WSn, where n is an integer greater than zero. The end user application 10 connects directly with each web services provider 20 to obtain different web services 25 that the end user application 10 request. In fact, each end user application 10 connects directly with each requested web service 25 from each web services provider 20 to obtain each different web service 25 requested. Thus, if the end user wishes to obtain X different web services 25, then the end user application 10 must make a connection 30 to each of the X web services 25.

One problem that arises from this process of exposing the web services 25 for consumption over the web by client applications is that in order to protect unauthorized access of these web services 25 over the Internet, all the web services 25 must somehow incorporate authentication and authorization of users and other security measures. When a user wishes to use a web service 25 on a server, the server usually needs to ensure that (a) the user is authentic and (b) is authorized to access the web service. This authentication of the user is typically done by sending the user's name and password to the server which then verifies the given data before granting access. Since the authentication data is sensitive, it is desirable to send the authentication data over a secured channel, such as the hypertext transfer protocol over secure socket layer (https), which encrypts the data. Once the user is authenticated, the user's access to the web service is verified. This is typically done by querying an Access Control List (ACL) for the user's access rights.

Complexity is added and efforts are duplicated if every web service 25 provided by a developer implements or is even aware of all of the above infrastructure. Aside from the infrastructure common to the services 25 provided, a developer may wish to provide value adding functionality to all or some of the web services 25. There is currently no way of adding these methods without having to reimplement them for each web service 25 or without the web service 25 even being aware that they exist.

Additionally, a company may wish to combine several web services 25 or parts of several web services 25 into an existing or new web service 25. It is time consuming for a developer to construct new web services 25 that call these other web services 25, and limiting in that the combinations are fixed at design time. There is no way to dynamically aggregate web services 25 based on a user's identity or some other criteria.

Furthermore, the location or address of a web service 25 must remain fixed so that its client applications will always know where to find it. However, the logistics of deployment may dictate that a web service 25 needs to be moved or exists on multiple servers at the same time. A user may not be able to find a web service 25 that has been moved from one location to another.

Web services 25 may be created from existing libraries of functionality with an existing application programming interface (API). In order to restrict access and bill by method, identification data must be provided by the client for every invoked method call. Adding these additional parameters, or any parameter that may be required by the particular business logic involved to an existing API is both complex and time consuming.

Currently, web service 25 capabilities remain uniform, irrespective of the identity of the client accessing them. This implies that there is no means of tailoring those web services 25, based on the presumed or assigned roles of the clients. For developers creating applications which consume a company's web services 25, this software 'contract', i.e., the list of functionality provided by a particular web service 25, is fixed. For companies providing these web services 25, there is no standard means of modifying the contract for different developers. Also, these developers, provided with a particular contract for web services 25, cannot count on the company providing the web services 25 with a means of limiting usage of these web services 25 to consumers of the application being developed by the developer.

Typically, the problems listed above are addressed by creating a library encapsulating the common or new functionality which is then consumed from each location where it is needed. This is inadequate here, as it does not offer the flexibility of leaving the web services 25 in question entirely intact and unaware that they are part of the infrastructure. Nor does it allow a dynamic data-driven approach to the problem since the behaviors are fixed at design time.

Current solutions also do not describe any mechanism for a means to customize that contract in any way, either for the developer of the application that consumes the web services 25, or for the user of that application. In order to provide this customization, the publisher of the web service 25 must develop several versions of the web service 25 in parallel, each version with capabilities unique to each developer.

It is therefore desirable to provide means for better managing functionality for web services 25.

SUMMARY OF THE INVENTION

It is an objective of the invention to provide a novel system and method for managing functionality for web services that obviates or mitigates at least one of the disadvantages of existing systems.

In an aspect of the present invention, there is provided a gateway module for managing functionality for one or more web services. The web services gateway module comprises a client application interface unit for receiving communication from a client application over a standard protocol, a communication processor for processing the communication for a web service, and a web services interface unit for delegating the processed communication to the web service.

In another aspect of the present invention, there is provided a method for managing functionality for one or more web services. The method comprises steps of receiving communication from a client application over a standard protocol, processing the communication for a web service, and delegating the processed communication to the web service.

In another aspect of the present invention, there is provided computer readable media storing the instructions and/or statements for use in the execution in a computer of a method for managing functionality for one or more web services. The method comprises steps of receiving communication from a client application over a standard protocol, processing the communication for a web service, and delegating the processed communication to the web service.

In another aspect of the present invention, there is provided electronic signals for use in the execution in a computer of a method for managing functionality for one or more web services. The method comprises steps of receiving communication from a client application over a standard protocol, processing the communication for a web service, and delegating the processed communication to the web service.

In another aspect of the present invention, there is provided computer program product for use in the execution in a computer of a method for managing functionality for one or more web services. The computer program product comprises a module for receiving communication from a client application over a standard protocol, a module for processing the communication for a web service, and a module for delegating the processed communication the web service.

Other aspects and features of the present invention will be readily apparent to those skilled in the art from a review of the following detailed description of preferred embodiments in conjunction with the accompanying drawings.

BRIEF DESCRIPTION OF THE DRAWINGS

The invention will be further understood from the following description with reference to the drawings in which.

DETAILED DESCRIPTION OF THE PREFERRED EMBODIMENTS

Figure 2:
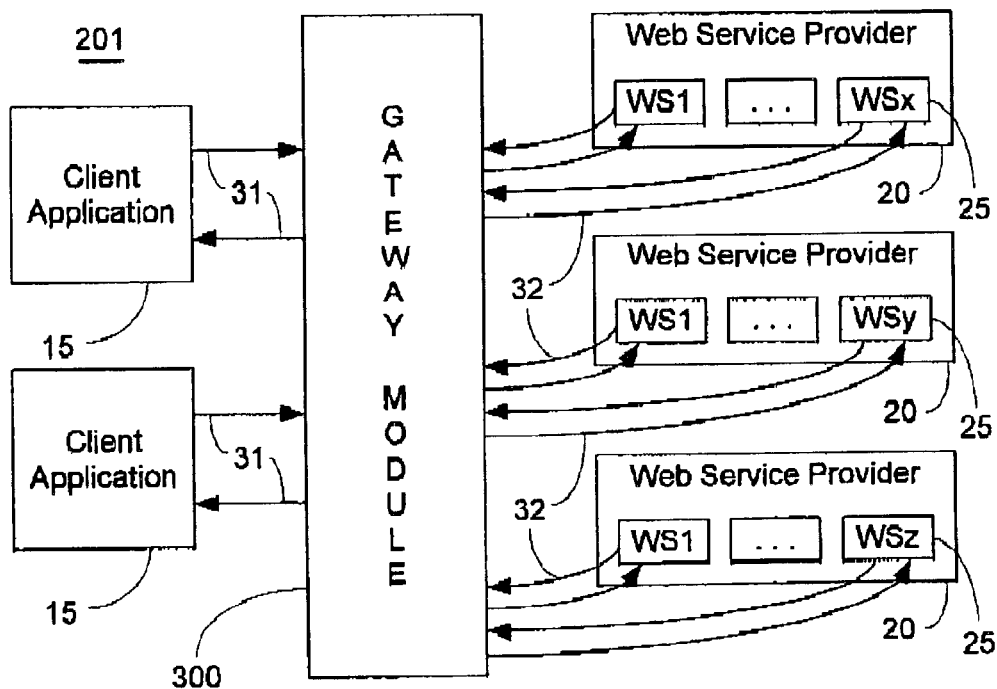
FIG. 2 is a diagram showing a web service infrastructure in accordance with an embodiment of the invention.

FIG. 2 shows a web services infrastructure 201 in accordance with an embodiment of the present invention. The web services infrastructure 201 comprises client applications 15, web service providers 20, a gateway module 300, client application connections 31 to the gateway module 300, and web service connections 32 to the gateway module 300. More or fewer client applications 15, web services 25, and their respective connections 31, 32, may exist in the web services infrastructure 201.

The client applications 15 may be end user applications 10, other web service providers 20, or any application which requests access to a web service 25. Some client applications 15 may be used by client application developers to obtain a web service application programming interface (API) contract to develop other client applications 15 that will consume or use that particular web service 25. Each client application 15 has a client application connection 31. Client application connections 31 may be any suitable connection that allows the transfer of information between the client application 15 and the gateway module 300. The web service providers 20 have web services WS1 to WSx, WS1 to WSy, and WS1 to WSz, where x, y, and z are integers greater than zero. The web services 25 may be different for each web service provider 20. Each web service 25 has a web service connection 32 to the gateway module 300. Web service connections 32 may be any suitable connection that allows the transfer of information between the web services 25 and the gateway module 300. The gateway module 300 is an application that adds common and additional functionality, as will be described below, to any web service 25 registered with the gateway module 300. The gateway module 300 remains transparent to the client application 15 and the web service 25. Web services 25 are registered with the gateway module 300 as described below. In this description, clients may sometimes be referred to as users, consumers, and/or end users.

Figure 3:
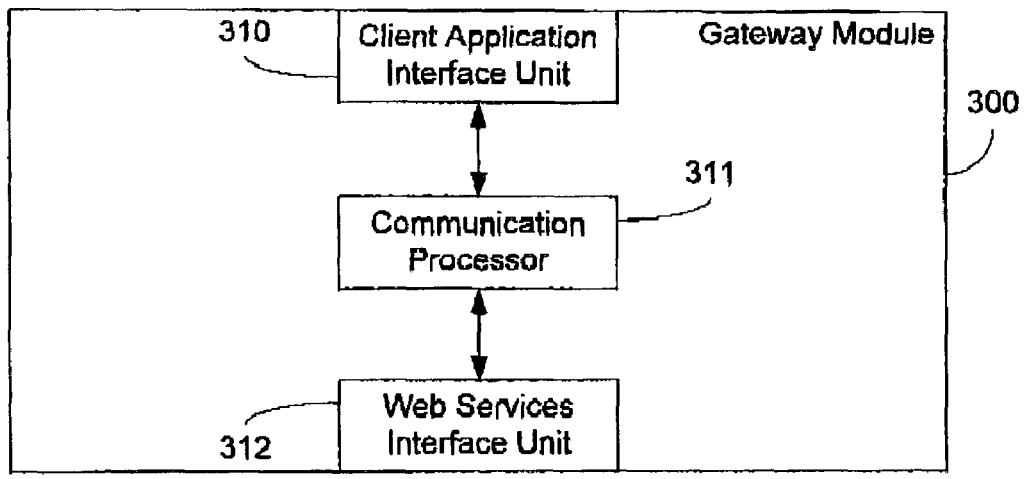
FIG. 3 shows an example of a gateway module in accordance with an embodiment of the present invention.

FIG. 3 shows an example of a gateway module 300 in accordance with an embodiment of the present invention. The gateway module 300 comprises a client application interface unit 310, a communication processor 311 and a web services interface unit 312. These components of the gateway module 300 comprise code that may be executed as software or embedded in hardware. The client application interface unit 310 receives web services requests coming from a client application connection 31 (shown in FIG. 2) connecting a client application 15 (shown in FIG. 2) with the gateway module 300. The client application interface unit 310 sends web services requests to the communication processor 311. The communication processor 311 determines which web service 25 is being requested and sends the web service request to the web services interface unit 312. The web services interface unit 312 sends the web service request to the appropriate web service 25 through the web service connection 32 (shown in FIG. 2) connecting that web service 25 with the gateway module 300. Other components may be added to the gateway module 300 as described below.

Alternatively, the gateway module 300 may not include a client application interface unit 310, whereby the function of the client application interface unit 310 is performed by either the communication processor 311 or an external module. Parts of the remainder of this application will refer to a gateway module 300 containing a client application interface unit 310. However, the client application interface unit 310 may be removed, and the communication processor 311 modified, as described above.

As is described above, the gateway module 300 may be used by both client application developers and client application users. When developing client applications 15 that may use a web service 25, client application developers may use the gateway module 300 to obtain a web service API contract from a web service 25. When a client application 15 is used by a client application user, the client application 15 may use the gateway module 300 to send a method call to a web service. Some method calls instruct a web service to perform a task. Some method calls instruct a web service to return an item or response. The web service 25 may use the gateway module 300 to return an item or response to the client application 15.

Figure 4:
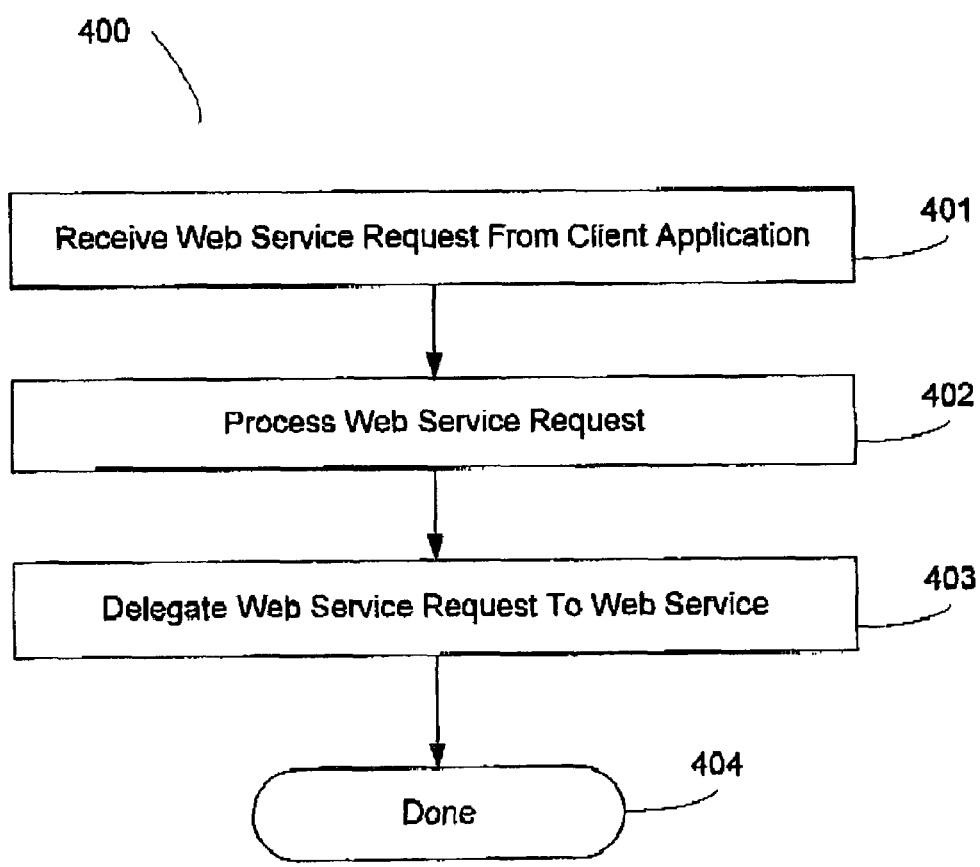
FIG. 4 shows a method for managing functionality for one or more web services in accordance with an embodiment of the present invention.

FIG. 4 shows a method for managing functionality for one or more web services 25 (400) in accordance with an embodiment of the present invention. The method (400) begins with receiving a web service request from a client application 15 (401). This step may be performed by the client application interface unit 310, or the communication processor 311 as described above. Next, the web service request is processed (402). This step may be performed by the communication processor 311. Finally, the web service request is delegated to the appropriate web service 25 (403). This step may be performed by the web services interface unit 312. Once the appropriate web service 25 has the web service request (403), the method is done (404). Further steps may be added to this method (400) as described below.

An aspect of an embodiment of the gateway module 300 pertains to the field of distributed computing, where software running on a client system interacts with software running on remote server systems. More specifically, where the software running on a server has been developed such that its capabilities can be discovered programmatically using the tools based on a standard network protocol based on a standard language. An example of a standard network protocol is the Internet protocol known as simple object access protocol (SOAP), which is itself based on the standard extensible markup language (XML). The actual data transmitted between the client application 15 used by client application user and the server code may be transmitted via SOAP. The server functionality is typically referred to as web services. A typical client application 15 may be either a web browser or an Internet-aware application. The following description refers mainly to SOAP communication, but the gateway module 300 may be used with other standard protocols based on a standard language.

Figure 5:
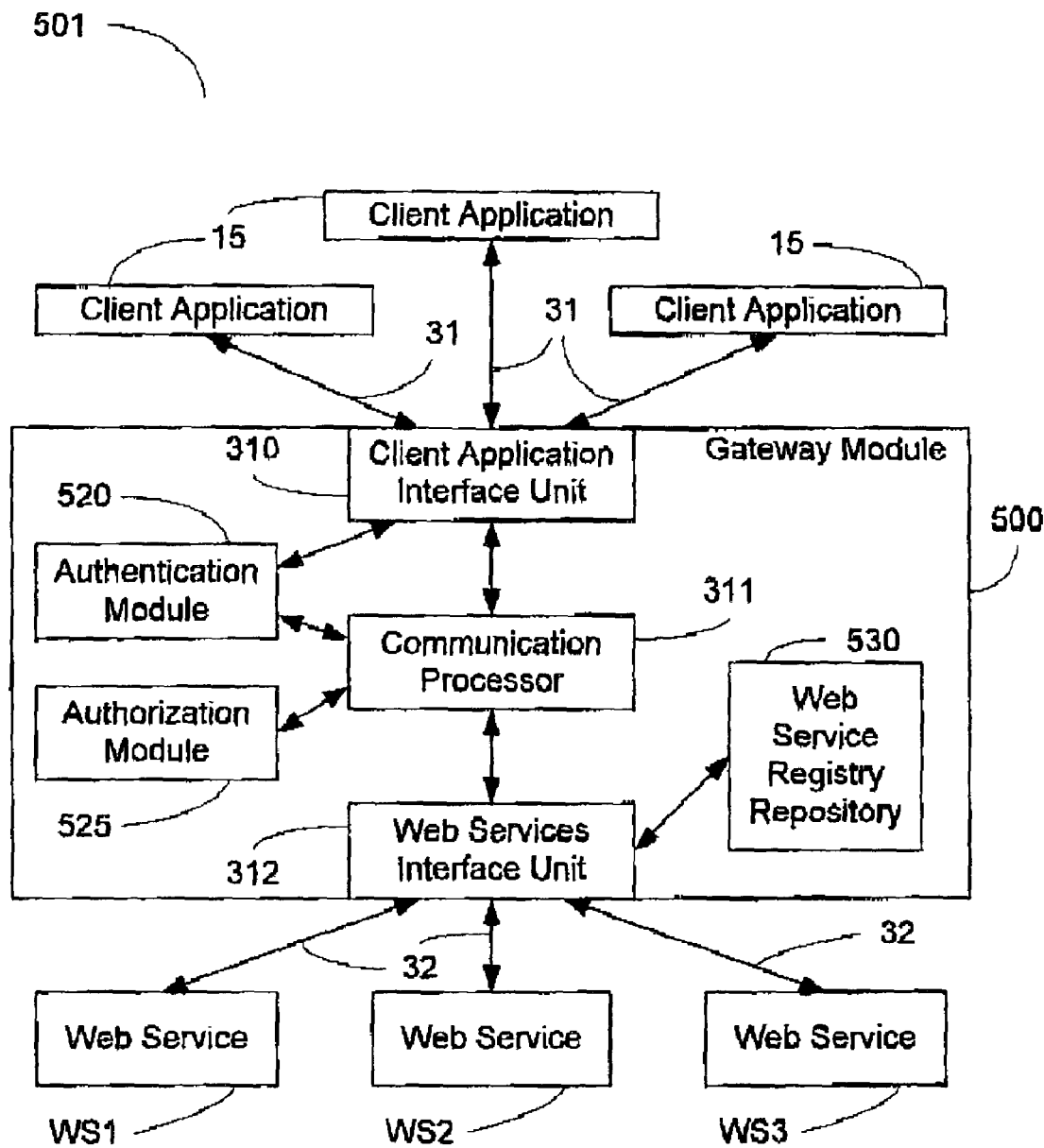
FIG. 5 shows another example of a web services infrastructure in accordance with an embodiment of the present invention.

FIG. 5 shows another example of a web services infrastructure 501 in accordance with an embodiment of the present invention. The web services infrastructure 501 comprises client applications 15, client application connections 31, a gateway module (or gateway module) 500, web services WS1, WS2 and WS3, and web service connections 32. More or fewer client applications 15, web services 25, and their respective connections 31 and 32 may exist in the web services infrastructure 501. The gateway module 500 comprises a client application interface unit 310, a communication processor 311, a web services interface unit 312, an authentication module 520, an authorization module 525, and a web service registry repository 530. The gateway module 500 is a centralized access point for client applications 15 to connect to web services 25. The authentication module 520 and the authorization module 525 may alternatively be contained in a combined authentication and authorization module. Other components may be added to the gateway module 500, as described below.

The client application interface module 310 may operate on hypertext transfer protocol (http) and SOAP. The communication processor 311 and the web services interface unit 312 may be similar to those described above referring to FIG. 3. The authentication module 520 and the authentication module 525 may comprise code for authenticating and authorizing a client application 15. The web service repository 530 is a centralized registry of web services being exposed. It may store a unique identifier (ID) of the web service 25, its location, an API contract request string, and a brief description, all of which is mapped to the web service's unique name or uniform resource identifier (URI).

The gateway module 500 is an application that sits between client applications 15 and the web services 25 being consumed, intercepting communication between them. Some communication between client application 15 and web service 25 occurs over the SOAP protocol, while some communication includes the exchange of an API contract description, such as a web service description language (WSDL) contract document. The gateway module 500 acts as a SOAP processor with respect to communication between a web service 25 and a client application 15 used by a client application user. Furthermore, the gateway module 500 acts as an API contract (for example, WSDL) processor with respect to communication between a web service 25 and a client application 15 used by a client application developer. Therefore, the gateway module 500 transparently alters both the way the client application 15 calls the web service 25, and how the web service 25 appears to the client application 15 without either party being aware of the gateway module 500.

Figure 6A:
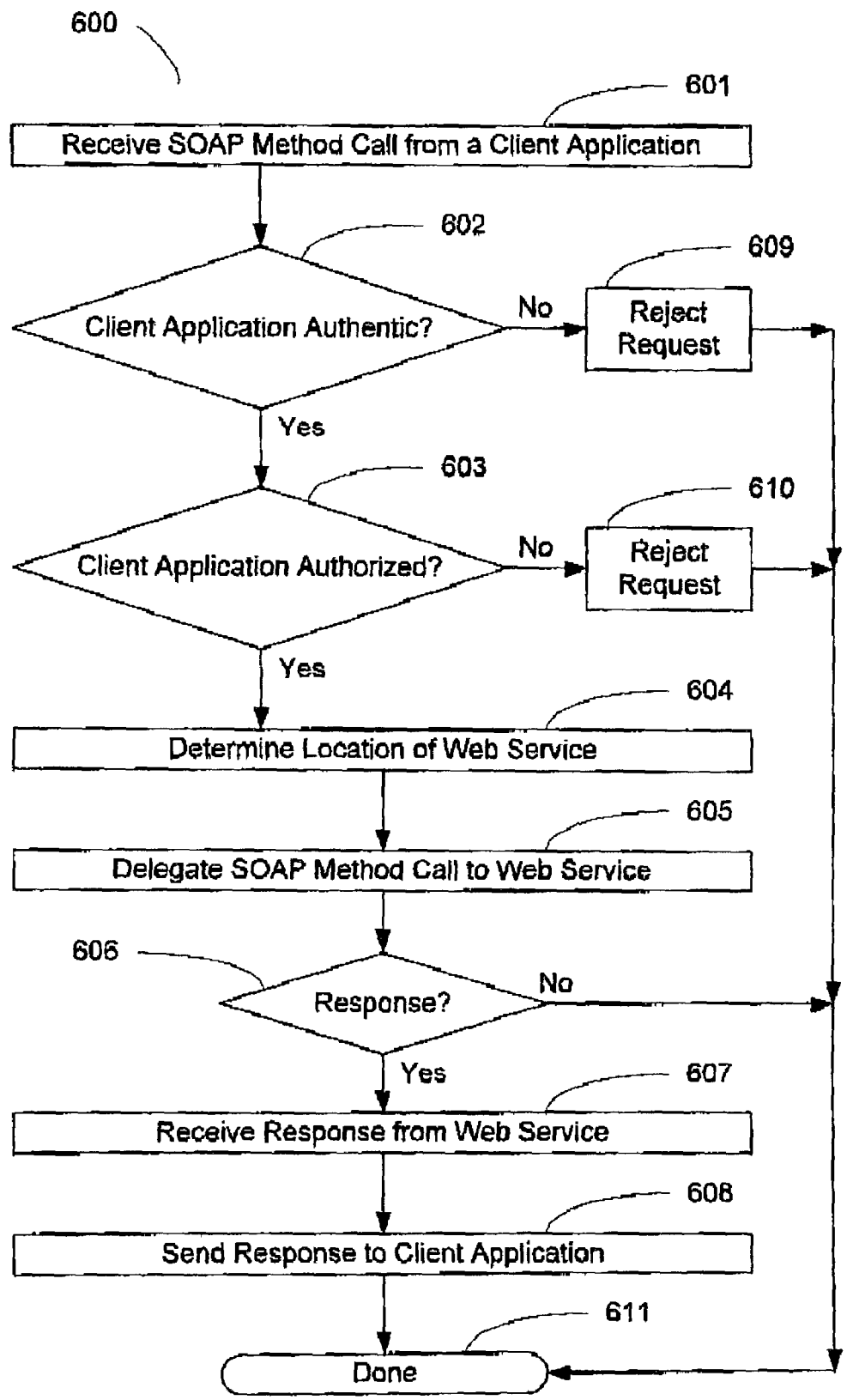
FIGS. 6A, 6B and 6C show other methods for managing functionality for one or more web services in accordance with an embodiment of the present invention.

FIG. 6A shows another example of a method for managing functionality for one or more web services 25 (600) in accordance with an embodiment of the present invention. This example relates to a client application user. To request the use of a web service 25, a client application 15 sends a SOAP based method call through the client application connection 31. The client application interface unit 310 receives the method call (601) and passes the method call to the communication processor 311. The communication processor 311 determines which web service 25 is associated with the method call. The method call is then passed to the authentication module 520 to authenticate the method call as coming from the client application 15 (602). The method call is passed back to the communication processor 311. If the client application is authentic (602), then the method call is passed to the authorization module 525 to determine if the client application 15 has authorization to use the requested web service 25 (603). The method call is passed back to the communication processor 311. If the client application is not authentic (602), then the method call is rejected (609). If the client application 15 is not authorized to use the method in the web service 25 (603), then the method call is rejected (610). A rejected method call may be returned back to the client application 15 through the corresponding client application connection 31. The rejection may include an error message explaining why the method call is rejected. Alternatively, a rejected method call may be ignored and the corresponding client application connection 31 closed. If a method call is rejected (609) or (610), the method is done (611).

If the client application 15 does have authorization (603), then the method call is passed to the web services interface unit 312. The web services interface unit 312 searches the web service registry repository 530 to determine the location of the requested web service 25 (604). The web service registry repository 530 provides a mapping from the identity of the web service (a URI) to the physical location of the web service 25 and any other attributes of the web service 25 that are desirable to assist the gateway module 500 to interpret, process, and make actual requests or method calls of said web service 25. Once the location of the web service 25 is determined (604), the method call is delegated to the web service 25 via the corresponding web service connection 32 (605).

If the method call does not have a corresponding response (606), then the method is done (610). Otherwise, the web services interface unit 312 receives a corresponding response from the web service 25 (607), in response to the method call. The web services interface unit 312 passes the response to the communication processor 311 to be passed back to the client application interface unit 310. The client application interface unit 310 sends the response through the appropriate client application connection 31 to the client application 15 from which the method call originated (608). The method is done (611).

Figure 6B:
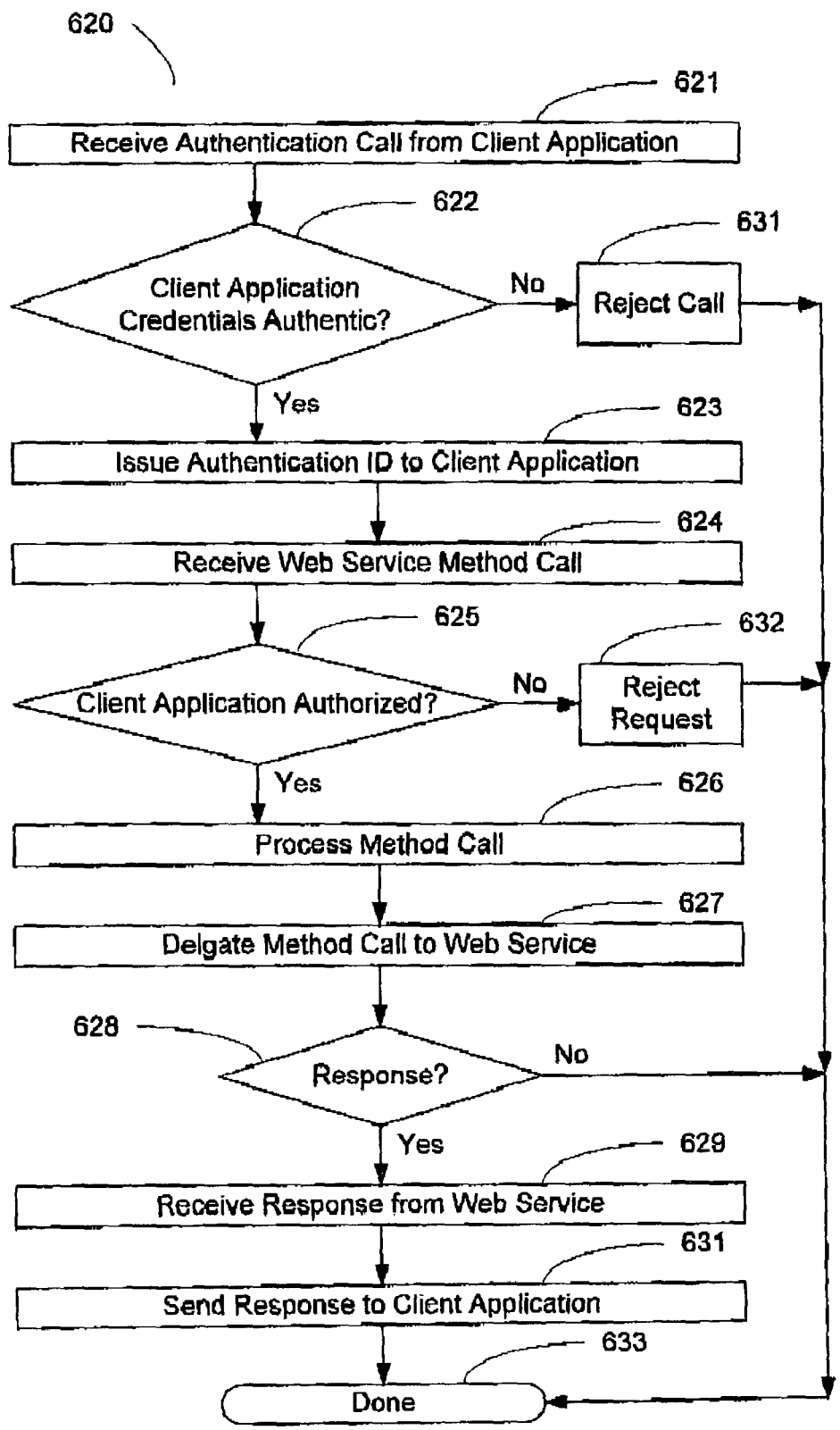

FIG. 6B shows another example of a method for managing functionality for one or more web services 25 (620) in accordance with an embodiment of the present invention. This example also relates to a client application user. To request the use of a web service 25, a client application 15 calls an authentication method through the client application connection 31. The authentication method call contains the client application credentials such as user name and password. The client application interface unit 310 receives the authentication method call (621) and passes the authentication method call to the authentication module 520 to authenticate the client application credentials (622). If the credentials are authentic (622), i.e., the client application is registered with the gateway module 500, then the authentication module 520 issues an authentication identifier (ID) (523) and passes the authentication ID to the client application interface unit 310 to pass to the client application 15. If the credentials are not authentic (622), then the authentication call is rejected (631) and the method is done (633). Alternatively, the authentication module 520 issue an error response to be sent to the client application 15.

An issued authentication ID may be passed as a parameter with subsequent web service method calls invoked by the client application 15. The client application interface unit 15 receives a web service method call (624) and passes the method call to the communication processor 311. The communication processor 311 determines which web service 25 is associated with the method call. The method call is then passed to the authorization module 525 to determine if the client application 15 associated with the authentication ID is authorized to use the method call in the web service 25 (625). For example, authorized client applications 15 for methods in web services 25 may be listed in a repository. If the client application 15 is not authorized to use the method call (625), then the method call is rejected (632) and the method is done (633).

If the client application 15 is authorized to use the method call (625), then the method call is passed to the communication processor 311 to be processed (626), i.e., prepared to be delegated to the web service 25. The authentication ID parameter is removed from the method call and the modified method call is passed to the web service interface unit 312. The web services interface unit 312 searches the web service registry repository 530 to determine the location of the requested web service 25, as described above. The method call is delegated to the web service 25 via the corresponding web service connection 32 (627).

If the method call does not have a corresponding response (628), then the method is done (633). Otherwise, a response is received from the web service 25 (629) and sent to the client application 15 (630), as described above. The method is done (633).

Figure 6C:
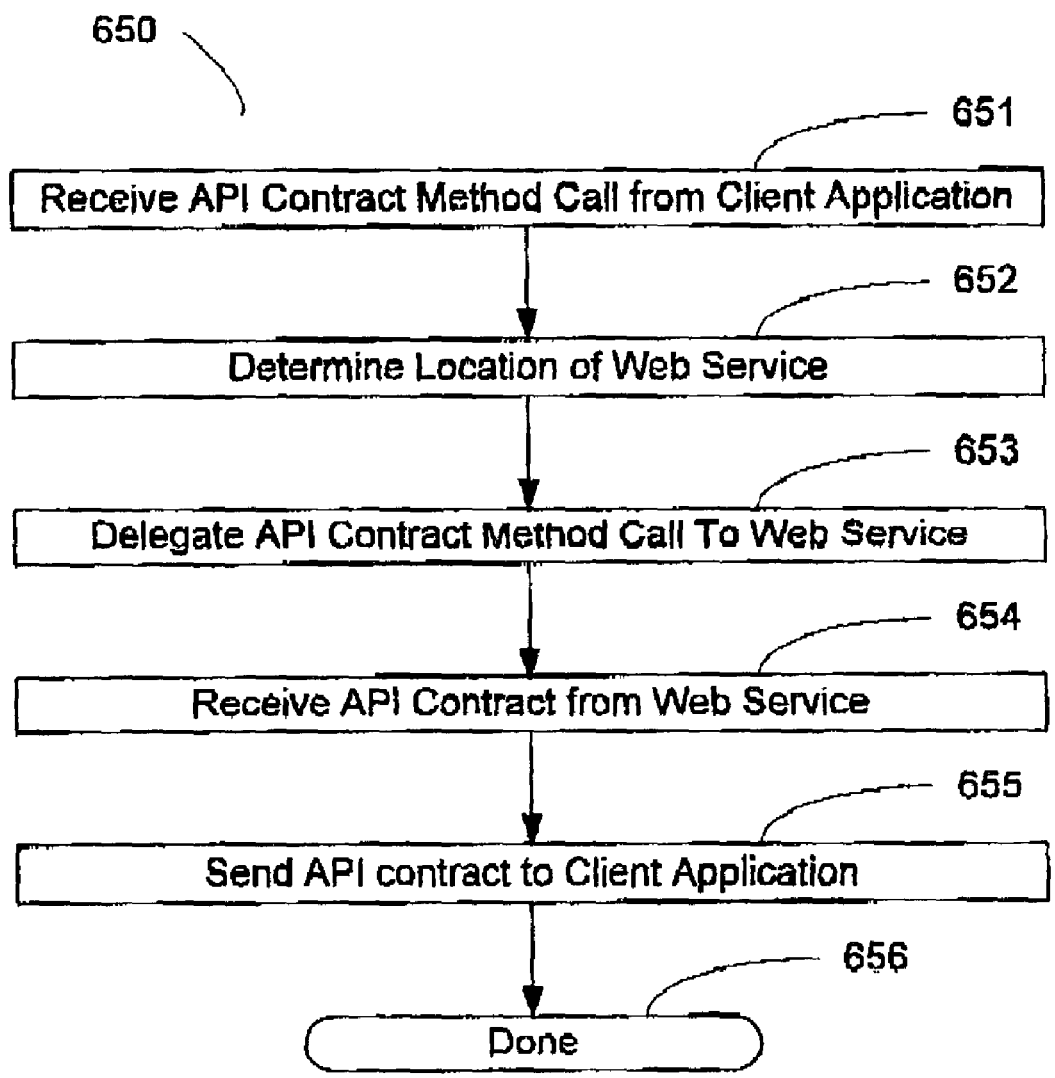

FIG. 6C shows another example of a method for managing functionality for one or more web services 25 (650) in accordance with an embodiment of the present invention. This example relates to a client application developer. To request an API of a web service 25, a client application 15 sends an API request method call (API request) through the client application connection 31. The client application interface unit 310 receives the API request and passes the API request to the communication processor 311 (651). The communication processor 311 determines which web service 25 is associated with the API request. The API request is then passed to the web services interface unit 312. The web services interface unit 312 searches the web service registry repository 530 to determine the location of the requested web service API (652). The web service registry repository 530 provides a mapping from the web service 25 URI to the physical location of the web service 25 and any other attributes of the web service 25 that are desirable to assist the gateway module 500 to interpret, process, and make actual requests or method calls of said web service 25. Once the location of the web service 25 is determined (652), the API request is delegated to the web service 25 via the corresponding web service connection 32 (653).

The web services interface unit 312 receives the requested web service API contract from the web service 25 (654) in response to the API request. The web services interface unit 312 passes the API contract to the communication processor 311 to be passed back to the client application interface unit 310. The client application interface unit 310 sends the response through the appropriate client application 31 to the client application 15 from which the API request originated (655). The method is done (656). Alternatively, the method may include access restriction measures such as requirements for authentication and/or authorization, as described above with respect to web service method calls.

Figure 1:
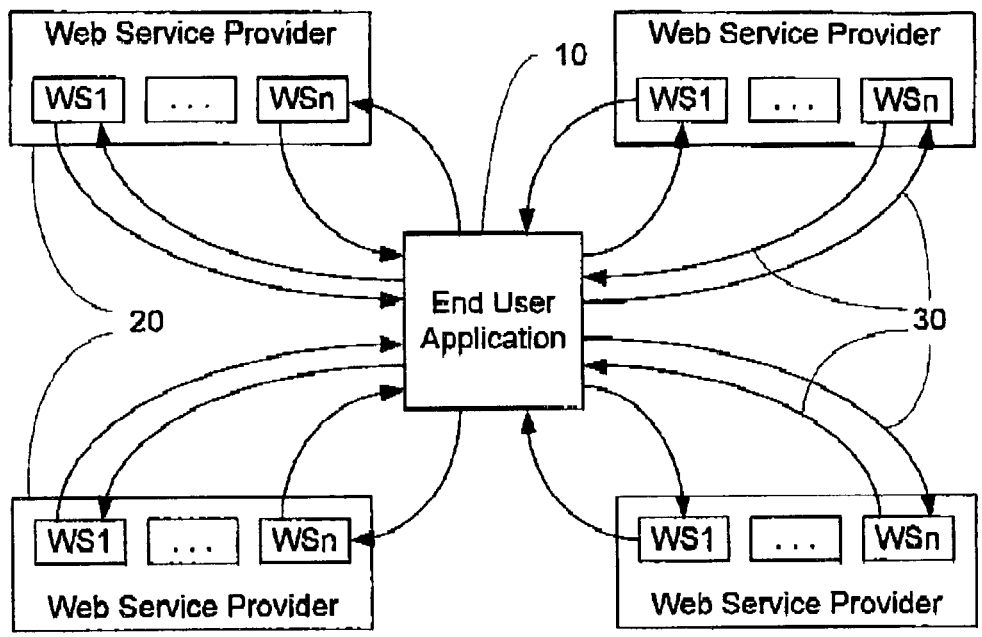
FIG. 1 is a diagram showing a standard web service deployment environment.

The gateway module 500 is transparent to the client application 15 and the web services 25. The gateway module 500 processes communication between client application 15 and web service 25. In the case of a client application developer, a single entry point, i.e., a single address, is exposed for client application developers to retrieve a web service API contract document, such as WSDL. WSDL contains a port, which is a single address in which to bind a client application 15. A WSDL returned by normal web services 25 contains its own address. Hence if a client application 15 has ten web services, the client application 15 will require ten addresses to connect to these web services 25 (as depicted in FIG. 1). An API contract processor in the communication processor 311, such as a WSDL processor, replaces this port address with the address of the gateway module 500 before returning the WSDL back to the client application developer. This ensures that the client application 15 that will be created by the client application developer will send its SOAP requests to the address that is associated with the client application interface unit 310. Subsequent SOAP requests sent by the client application 15 are received by the client application interface unit 310 and delegated to a web method call processor, such as a SOAP processing module, in the communication processor 311.

Two scenarios are described above: A) requests from a client application user (method calls over SOAP); and B) requests from a client application developer for the API contract (WSDL). In scenario A, the gateway module 500 acts as a SOAP processor. Scenario A occurs over the SOAP protocol whenever a method of the web service 25 is invoked. In scenario B, the gateway module acts as an API contract (WSDL) processor. Scenario B does not occur over SOAP and occurs during the design/development time of the client application 15 consuming the web service 25. In both scenarios, there may be two areas of processing: i) the processing of the request before the request is forwarded to the web service 25; and ii) if there is a response, the processing of the response before it is returned to the client application 15.

This description contains references to login and logon procedures. The embodiments of the inventions described in this specification apply to both login and logon procedures. A login reference is intended to include a logon reference and vice versa.

A client application user or client application developer may call a Login method, passing his/her credentials, through the use of a client application 15. The credentials may be authenticated and a list of web services 25 to which the client application 15 is authorized to access may be established and stored in a repository. After authenticating the credentials, the gateway module 500 returns an authentication ID to be passed with every method call. Advantageously, this simplifies the authentication and authorization checking steps in the management of web service 25 functionality. The use of authentication IDs will be described further below.

In order to achieve the transparency described above, client application developers may use parameters added to and/or modified from existing parameters to method calls of web services 25 API contract. These extra and/or modified parameters are created by an administrator or developer of the gateway module 500 and assist the gateway module 500 to distinguish method calls from one client application 15 from method calls of another client application 15. Furthermore, the extra and/or modified parameters assist in other administrative functions such as classification and storage of the web service 25 method calls, and storage of authentication IDs. The API contract request method may also include extra parameters. The areas of processing referred to above relate to i) transformations between the method call received from the client application 15 and the method call passed to the web service; and ii) transformations between the response, if any, received from the web service and the response passed to the client application 15.

Figure 7A:
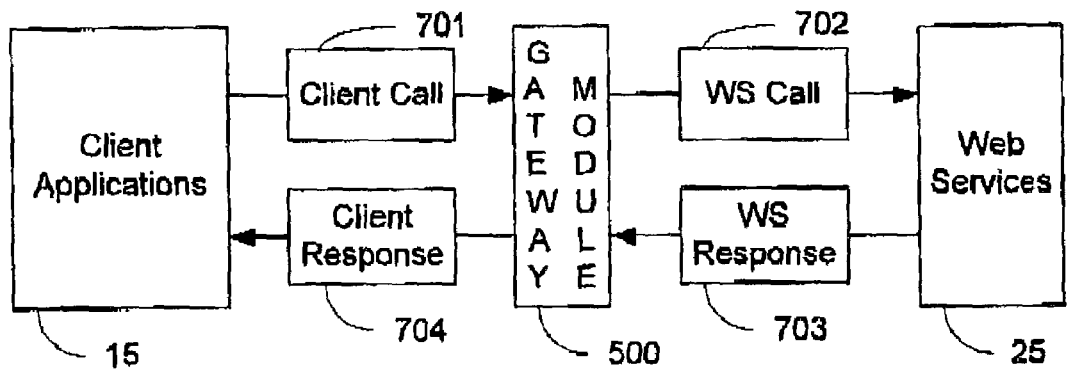
FIGS. 7A is a diagram showing the gateway module as a simple object access protocol processor in accordance with an embodiment of the invention.

FIG. 7A shows a depiction 701 of the web services infrastructure 501 as a SOAP processor in accordance with an embodiment of the present invention. A client application 15 (such as an end user application used by a client application user) invokes a SOAP method call (client call) 701. The client call 701 is received by the gateway module 500, as described above. The client call 701 is modified by a SOAP processor of the communication processor 311 of the gateway module 500. The modification here may include the removal of an extra parameter which was added to the web service SOAP method call by the client application developer. Thus the modification translates the client call 701 into the actual web service SOAP method call (WS call) 702 understood by the web service 25. The WS call 702 is sent by the gateway module 500 to the web service 25, as described above.

The gateway module 500 receives a web service SOAP response (WS response) 703 from the web service 25, as described above. The SOAP processor of the communication processor 311 translates the WS response 703 into a SOAP based response (client response) 704 that the client application 15 will understand. The translation may be the addition or modification of a parameter in the WS response. The gateway module 500 then sends the client response 704 to the client application 15, as described above.

The ability to act as a SOAP processor allows the functionality of the web services 25 to be better managed. Since the web services infrastructure 501 is listening to SOAP communication between client 15 and web service 25, the web services infrastructure 501 has the information to determine what methods 701 are being called, under what conditions and even by whom, provided that identification information was given by the caller. Furthermore, the web services infrastructure 501 is able to check authentication, authorization, and/or billing information and determine if the method call should be allowed to proceed to the service. When the response from the web service 25 returns, the web services infrastructure 501 is then able to update any relevant billing or audit information, as described below. In general the web services infrastructure 501 can perform infrastructure functions common to the related web services 25 because the web services infrastructure 501 is privy to the information passed from client application 15 to web service 25.

Figure 7B:
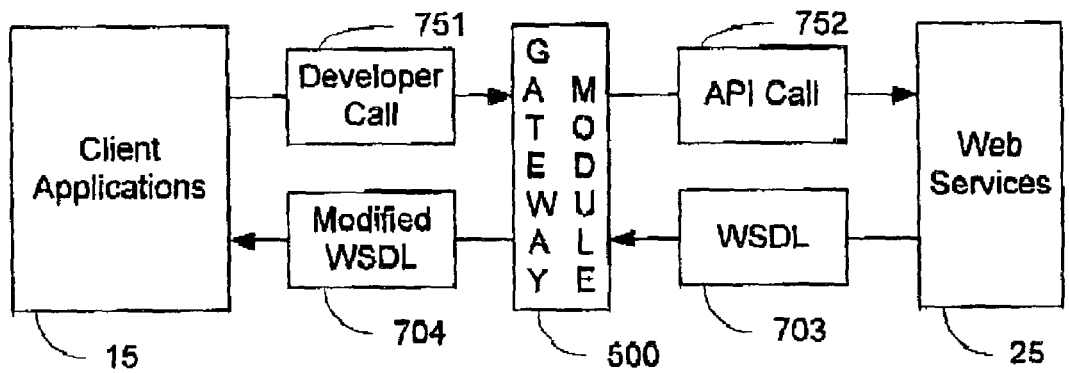
FIGS. 7B is a diagram showing the gateway module as an application programming interface contract processor in accordance with an embodiment of the invention.

FIG. 7B shows a depiction 750 of the web services infrastructure 501 as an API contract processor in accordance with an embodiment of the present invention. A client application 15 (such as a programmer application used by a client application developer) may make a method call (developer call) 751 requesting the API contract of a web service 25. The developer call 751 is received by the gateway module 500, as described above. The developer call 751 is modified by an API contract processor of the communication processor 311 of the gateway module 500. The modification here may include the removal of an extra parameter which was added to the API contract method call. Thus the modification translates the developer call 751 into the actual API contract method call (API call) 752 understood by the web service. For example, an HTTP GET request method call may be used to obtain a web service API contract. The API call 752 is sent by the gateway module 500 to the web service 25, as described above.

In response to the API call 752, the gateway module 500 receives an API contract (for example, WSDL) 753 from the web service 25 as described above. The API contract processor of the communication processor 311 translates the WSDL 753 into a modified WSDL 754 that the client application developer will use. The translation may be the addition or modification of a parameter in the WSDL 753, such as the modification of an address, as described above. The gateway module 500 then sends the modified WSDL 754 to the client application 15, as described above.

By modifying the API contract (WSDL) 753 as it is delivered from the web service 25 to the client application 15, the web services infrastructure 501 is able to enforce the requirement of the consuming client application developer to insert parameters into any or all method calls in that web service 25. This allows the newly developed client application 15 to believe the added or amended parameters are part of the web service 25 method being invoked while the web service 25 is not even aware that parameters exist. When the new client application 15 calls the method 701, the SOAP processor in the gateway module 500 strips out the extra parameters, performs any processing required, and passes the SOAP message (minus the extra parameters) 702 onto the web service 25. For example, the web services infrastructure 500 can receive and process a user identifier parameter which allows for the association of method calls 701, 702 to a given client application 15 and all of the authorization and billing information appropriate for that client application 15. The web services 25 are not concerned with the identifier and the identifier need not be a parameter for any of their methods 702. From the client application 15 point of view, however, the methods 701 use this parameter.

Figure 8:
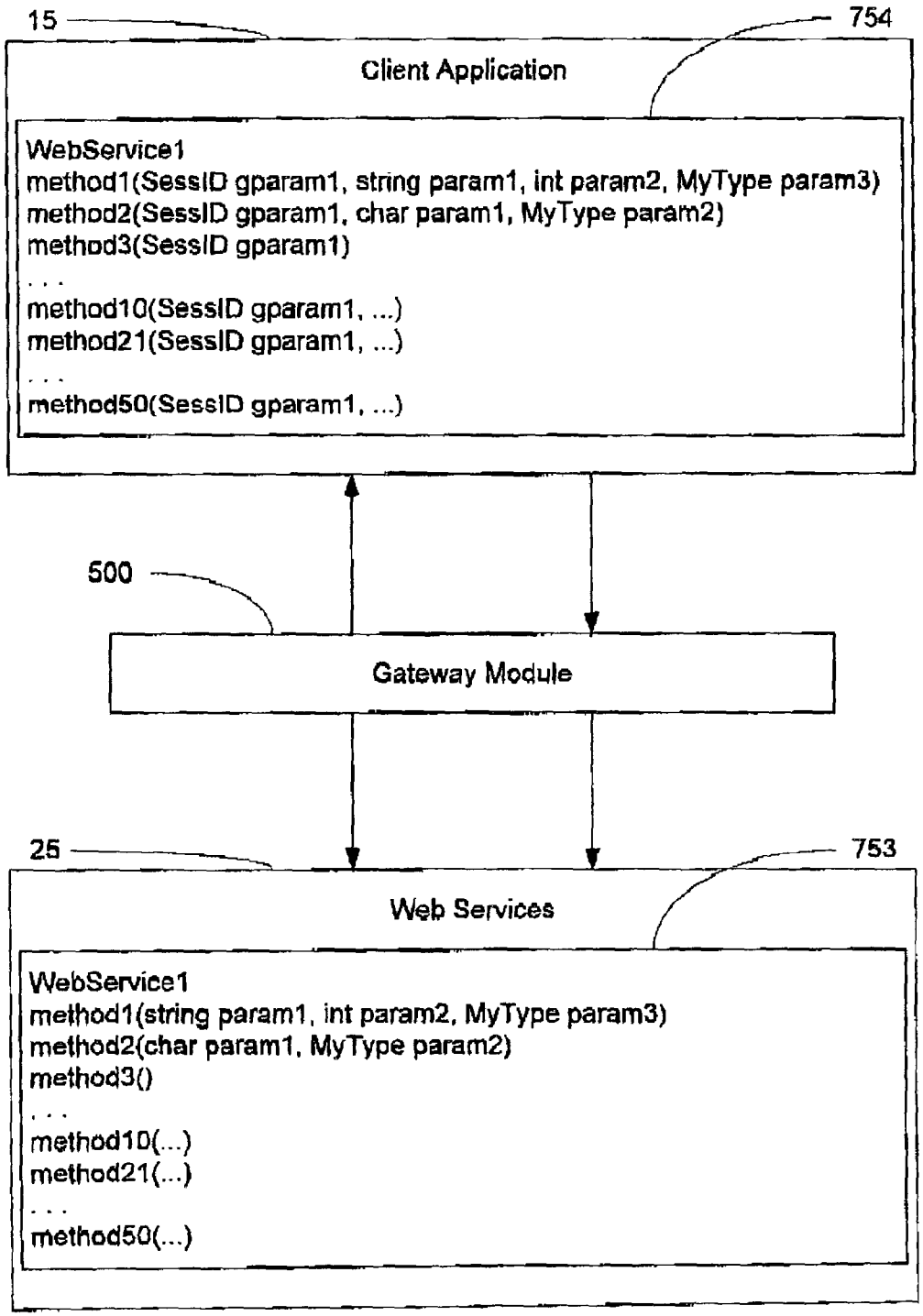
FIG. 8 is a diagram showing a modification to an application programming interface through the gateway module in accordance with an embodiment of the invention.

FIG. 8 shows an example of a modification to an API contract through the gateway module 500 in accordance with an embodiment of the present invention. A web service API contract 753 may contain many method calls, i.e., WS calls 702. As an example, FIG. 8 shows a web service WS1 API contract 753 as containing 50WS calls 702. Three examples of WS calls 702 given in FIG. 8 include:

method1(string param1, int param2, MyType param3);
method2(char param1, MyType param2); and
method3( ).

FIG. 8 also depicts the modified web service WS1 API contract 754 as seen by the client application 15 with method calls, i.e., client calls 701, that contain an additional parameter "gparam1" of type "AuthID". For example, this additional parameter may be an identifier that the client application 15 is authorized to use the method in the web service 25. In this example, the additional parameter is placed as the first parameter to all client calls 701. Other parameters may be added to the client calls 701. Thus, the three corresponding examples of client calls 701 in the client application 15 are:

method1(AuthID gparam1, string param1, int param2, MyType param3);
method2(AuthID gparam1, char param1, MyType param2); and
method3(AuthID gparam1).

Additionally, if it is a requirement for a web service 25 to have certain parameter types converted to other types (from the perspective of the client caller), these parameters, along with the associated target types, and the conversion method would be described in the web service registry 530, or an additional table indexed off of the web service registry 530.

By modifying the API contract, the gateway module 500 can make it appear that any web service 25 has any set of methods as desired, regardless of what methods the service actually implements. As long as calls to these methods are honored somewhere inside of the web services infrastructure 501, it appears to the client application 15 as though the client method was really implemented by the web service 25. The web service 25 remains unaware that the client method exists let alone that the separate client call 701 was made. In general the web services infrastructure 501 is able to dynamically modify the methods that would appear to be offered by a web service 25; even adding methods that might have a central implementation somewhere inside of the web services infrastructure. For example, for more convenient calling on the client side, the web service provider 20 may add a DoMethod( ) method that takes an enumeration of the methods offered by a given web service 25 to each web service 25 it offers.

In similar ways that extra methods can be added to a given web service 25, new virtual services can be composed of methods from various other web services 25 using the infrastructure 501. By creating a complete API contract 753 for a virtual service that does not really exist, the infrastructure 501 can then route the client calls 701 made to said virtual service methods to the real web services 25 that implement the WS methods 702. These virtual services could be composed by a system administrator through an application that interfaces with the infrastructure's databases.

Again, through modification of the API contract 753 whenever it is requested, the gateway module 500 is able to make it appear that a web service 25 resides at any virtual location. By ensuring that the WSDL processor of the gateway module 500 intercepts references to the web service 25 at this virtual location, the gateway module 500 can then route the call to one of the physical locations where it actually exists. When a web service 25 changes its physical location, it is just a matter of updating the data table in the web service registry repository 530 that indicates its location to the gateway module 500. The original entry in the web service registry repository 530 may be created through a gateway module system administration application when a web service 25 is registered with the gateway module 500. Clients need not even be aware that the web service 25 has moved.

Figure 9:
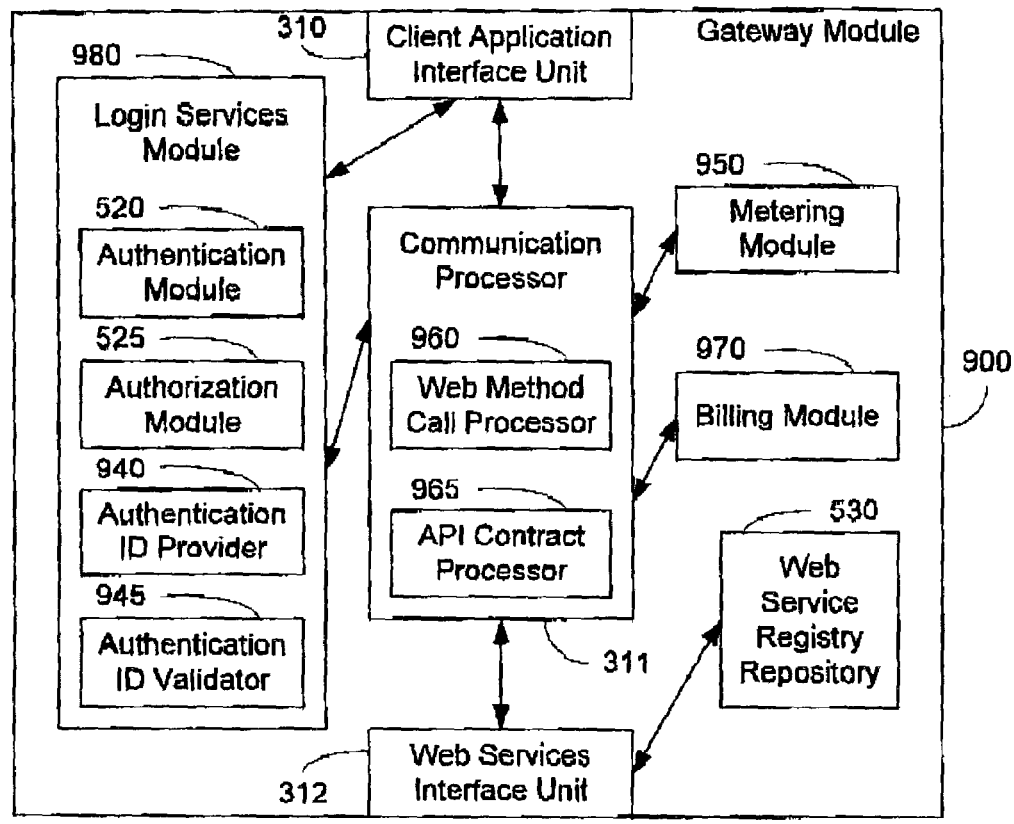
FIG. 9 shows another example of a gateway module in accordance with an embodiment of the present invention.

FIG. 9 shows another example of a gateway module 900 in accordance with an embodiment of the present invention. The gateway module 900 includes a client application interface unit 310, a communication processor 311, a web services interface unit request dispatcher, 312, a web services registry repository 530, a metering module 950, a web method call processor 960, a web service API contract processor 965, a billing module 970, and a login services module 980. The login services module comprises an authentication module 520, an authorization module 525, an authentication identifier (ID) provider 940, and an authentication ID validator 945. Components may be added to or removed from the gateway module 900.

The client application interface unit 310, communication processor 311, web services interface unit 312, authentication module 520, authorization module 525, and web services registry repository 530 may be similar to those described above. The metering module 950 keeps track of the usage of web service client call 701 methods for the specific client application 15, including the number of client calls 701 made and amount of server resource consumed. The web method call processor 960 comprises code to perform the modifications to the method calls 701, 702 and responses 703, 704 described above. The web method call processor 960 may be a SOAP processor, or any suitable processor for other web method protocols. The API contract processor 965 comprises code to perform the modifications to the API method calls 701, 702 and WSDL 703, 704 described above. The API contract processor 965 may be a WSDL processor, or any suitable processor for other web service API. The billing unit 970 comprises code to bill client applications 15 for the transparent use of web services 25. The login services module 980 comprises code to administer and service a login request received from a client application 15, and to administer authorization and authentication of a client application 15. The login request may be passed directly to the login services module 980 from the client application interface unit 310. Alternatively, the login request may be first sent to the communication processor 311 to be sent to the login services module. The authentication ID provider 940 may comprise code which assigns one or more authentication IDs to a client application 15 when the client application 15 logs into a web service 25. The authentication ID validator 945 may comprise code to validate the authentication ID. These components will be further described below.

Figure 10:
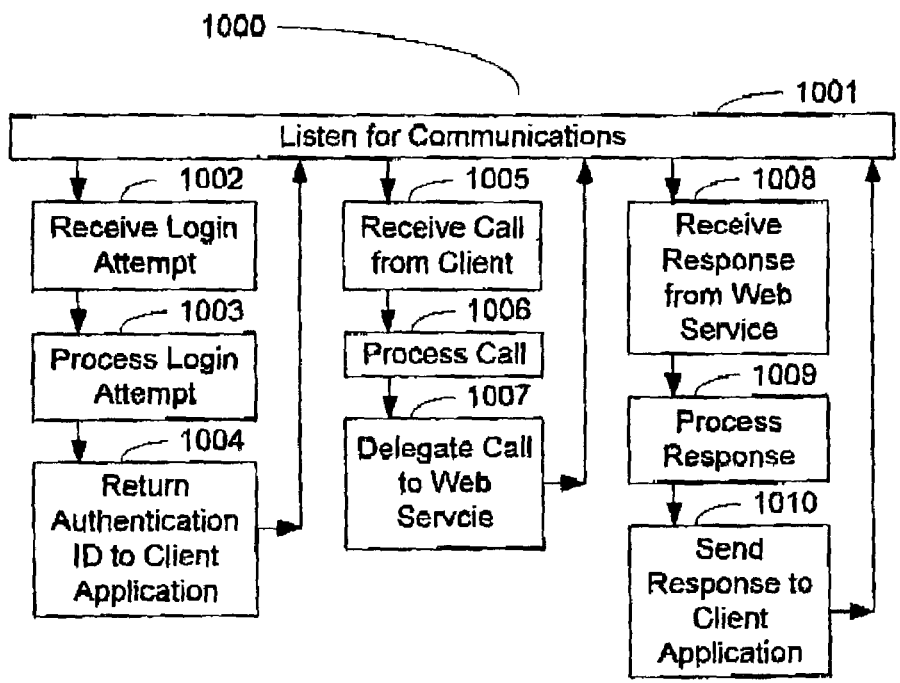
FIG. 10 shows another method for managing functionality for one or more web services in accordance with an embodiment of the present invention.

FIG. 10 shows another example of a method for managing functionality for one or more web services 25 (1000) in accordance with an embodiment of the present invention. The method (1000) begins with listening for communications between client applications 15 and web services 25 (1001). The communications may be client applications 15 attempting to log into web services 25, client applications 15 sending web service method calls 701 or API contract method calls 751, or web services 25 sending responses to either method calls 703 or API contract method calls 753.

If the client application interface unit 310 receives a login request (1002) to a web service 25, the client application interface unit 310 sends the login request to the login services module 980. Alternatively, the login request may be passed to the communication processor 311 to be passed onto the login services module 980. The login services module 980 processes the login request (1003). The authentication module 520 validates the client application 15, as described above. If the login request is successful, i.e., the client application 15 is valid, then the authentication ID provider 960 issues an authentication ID for the client application 15. Information regarding the web service 25 for which the authentication ID is valid may be stored in the authentication ID validator 965. Alternatively, the information relating to the issued authentication ID may be stored in an additional repository accessible by the authentication ID validator 965. The client application interface unit 310 returns the authentication ID to the client application 15 (1004). The gateway module 500 now returns to a state of listening for communications (1001). This thread will be further described below.

If the client application interface unit 310 receives a client call 701 or a developer call 751 (1005), the client application interface unit 310 passes the call 701, 751 to the communication processor 311. The call 701, 751 contains an authentication ID passed as a parameter. The web method call processor 960 would process a client call 701 (1006), as described above. The API contract processor 965 would process a developer call 751 (1006), as described above. The removed authentication ID is sent to the authentication ID validator 965 for validation. If the authentication ID is valid, then the communication processor 311 passes the corresponding WS call 702 or API call 752 to the web services interface unit 312 to be delegated to the appropriate web service 25 (1007). Information regarding the client application 15 and the call 701, 751 may be logged in a repository. The gateway module 500 now returns to a state of listening for communications (1001).

If the web services interface unit 312 receives a WS response 703 or a WSDL 753 (1008), then the web services interface unit 312 passes the WSDL 703 to the communication processor 311. The web method call processor 960 would process a WS response 703 (1009), as described above. The API contract processor 965 would processes a WSDL 703 (1009), as described above. If the call 702, 752 and the response 703, 753 are asynchronous, then information stored in a repository may be accessed to determine the client application 15 which sent the original call 701, 751 corresponding to the response 703, 753. If the call 702, 752 and the response 703, 753 are synchronous, then the identity of the client application 15 which sent the original call 701, 751 is clear. The client response 704 or modified WSDL 754 is passed to the client application interface unit 310 to be sent to the client application 15 (1010). The gateway module 500 now returns to a state of listening for communications (1001).

Other steps may be added to the method (1000), including metering the gateway module 900 usage and billing the client application 15, as well as billing a web service provider 20.

In alternative examples of a communication processor 311, the web method call processor 960 and the API contract processor 965 may comprise further sub-components, to handle their tasks. For example, the web method call processor may either contain a SOAP method call processor and a SOAP response processor. Similarly, the API contract processor may contain a WSDL communication processor and a WSDL response processor. Method call processors for other protocols and API contract processors for other API contract documents may be added to the web method call processor and the API contract processor, respectively. Furthermore, the communication processor 311 may be created to only contain desired sub-components.

An alternative to the login thread (1001-1002-1003-1004-1001) described above will now be described. Some of the detail in this alternative description may be used to augment the description of the above thread as well.

Using a secured channel is safer but slower than an unsecured channel since a secured channel requires the extra encryption/decryption steps. An alternative solution is to have the client application 15 log into the web service 25 once by sending client application credentials, typically a user name and password, over the secure channel and in return the client application 15 will receive a unique authentication identifier (ID) over the secured channel. Sometimes an authentication ID is called a session ID. However, there is a distinction between a session ID that refers to a locked communication between a client and a server and a session ID that refers to the fact that authentication has occurred. Thus, the term authentication ID is used in this specification.

Successive calls to the web service 25 are then made over an unsecured channel with the authentication ID to identify the client application 15. Since the client application credentials are not sent during the successive calls, the calls no longer needs to be done over a secure channel. The calls can be sent over an unencrypted channel, such as http. This will improve performance as well as limit the number of times that the client application credentials are sent. When the server receives a web service call, it will authorize the client application 15 by verifying that the authentication ID is valid at that point in time.

This use of an authentication ID is only partially acceptable since the client credentials are safe as they are passed over the secure channel once and the client application 15 can still be authenticated for access to web services using the authentication ID. The problem is that since the web service calls are not done over a secured channel, the authentication ID could be compromised. Anyone who is observing the unsecured channel could note the authentication ID as it is used in the web service calls. The observer could then reuse this authentication ID and gain unauthorized access to the web service 25.

One adaptation to the use of an authentication ID is to have the authentication ID time out after a certain period of time. Once an authentication ID has expired, anyone who has obtained it with or without authorization will no longer be able to use it and the authorized user will have to logon again and receive a new authentication ID. While the time-out of an authentication ID solution is better than no solution, there is still the problem that a misuse of a web service may occur for a limited time.

Another aspect of the gateway module 900 described here uses a pool of authentication IDs. A pool of authentication IDs contains a plurality of authentication IDs. As described above, the authentication ID provider 940 may comprise code which assigns one or more authentication IDs to a client application 15 when the client application 15 logs into a web service 25. These authentication IDs are passed as parameters in the method calls 701, 751 as described above. The authentication ID validator 945 may comprise code to validate the authentication ID. This authentication code be done in a number of ways. In an example of an embodiment of the present invention, a working table mapping is setup when the client application 15 is authenticated (i.e., authentication ID returned). The authentication ID is checked every time a method is called, then deleted if the client application 15 logs off or the authentication ID expires. An alternative of using a hashing system would require care to remain as secure.

The user of a client application 15 logs onto a web service 25 by sending client application credentials, typically a user name and password, over a secured channel as described above. In return, the client application 15 will receive a group or pool of authentication IDs. The pool of authentication IDs returned is secure since the pool is sent back over the secured channel. The exact number of authentication IDs returned can vary depending on the system administration requirements for the web service 25. Once the client application 15 has this pool of authentication IDs, the client application 15 may use a different authentication ID from this pool with each successive call to the web service 25. The authentication ID that is used will then expire upon use so that it can not be reused. This means that even if an eavesdropper is able to compromise an authentication ID, the eavesdropper will not be able to use it since it can only be used once.

Figure 11:
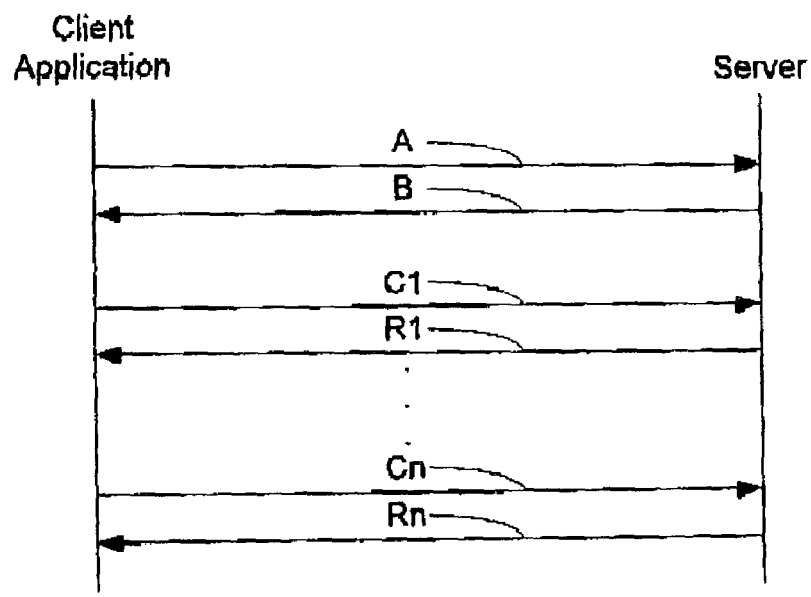
FIG. 11 is a diagram showing sequence of events to log into and make web service calls in accordance with an embodiment of the invention.

FIG. 11 shows the sequence of logging onto a web service 25 and using the pool of authentication IDs. In FIG. 11, the sequences are listed as A, B, C1, R1, . . . , Cn, Rn, where n is an integer greater than one. The step "A" represents a client application 15 sending client application credentials over a secured channel, such as https. The step "B" represents the server authenticating the user and returning a pool of n authentication IDs over the secured channel. The steps "C1" to "Cn" represent the client application 15 making up to n web service calls over an unsecured channel using a different authentication ID from the pool of n IDs returned. Each authentication ID will expire upon use. The steps "R1" to "Rn" represent the server validating the authentication ID used and returning the result of the web service call to the client application 15.

After the client application 15 has used up all the authentication IDs in the pool that was given, the client application 15 may log on again to receive another pool of authentication IDs. No one other than the client application 15 will be able to use the authentication IDs since the authentication IDs are always given to the client application 15 over a secured channel and the authentication IDs expire upon use. Each authentication ID is not compromised during or after its use over an unsecured channel because an unauthorized person who manages to capture an authentication ID only receives an expired authentication ID.

Further security features may be added to the pool of authentication IDs. For example, unused authentication IDs in a pool of authentication IDs can be set to expire after a preset event such as the expiry of a period of time.

Figure 12:
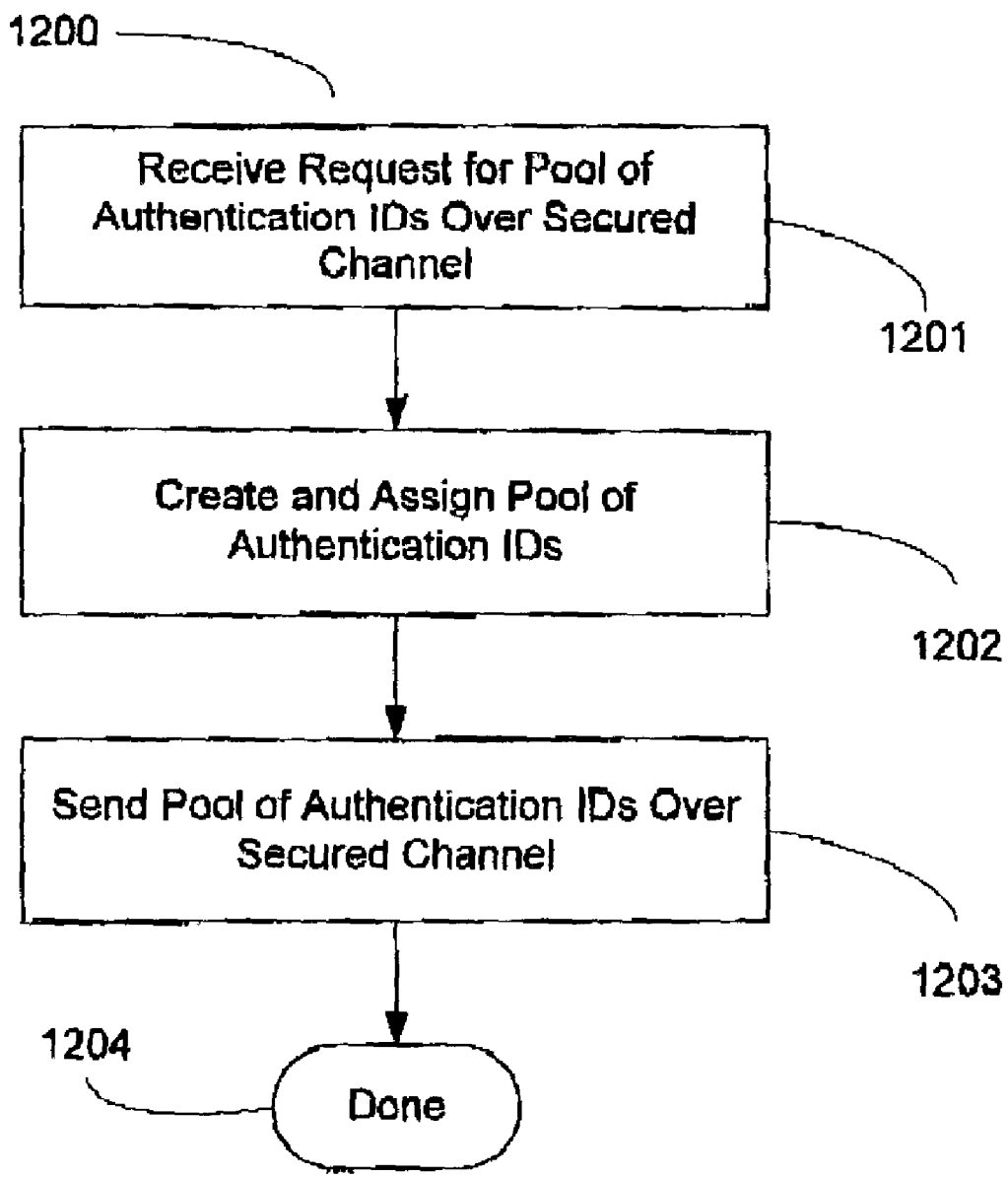
FIG. 12 is a flowchart showing a method for providing a pool of authentication identifiers in accordance with an embodiment of the present invention.

FIG. 12 shows a method for providing a pool of authentication IDs (1200) for use in web services communication. The method begins with the client application interface unit 310 receiving a request for a pool of authentication IDs (1201) over a secured channel. Typically, the request will come from a user using a client application 15. The request is passed to the authentication ID provider 940 of the login services module 980. The authentication ID provider 940 creates and assigns a pool of authentication IDs (1202). The authentication IDs may be passed as parameters by the client application 15 during web service communication, such as SOAP communication. The authentication IDs may be created and assigned by code in the authentication ID provider 940. The pool of authentication IDs is passed to the client application interface unit 310 to be sent to the client application 15 (1203) over a secured channel and the method is done (1204). The client application 15 may now use the authentication IDs.

Figure 13:
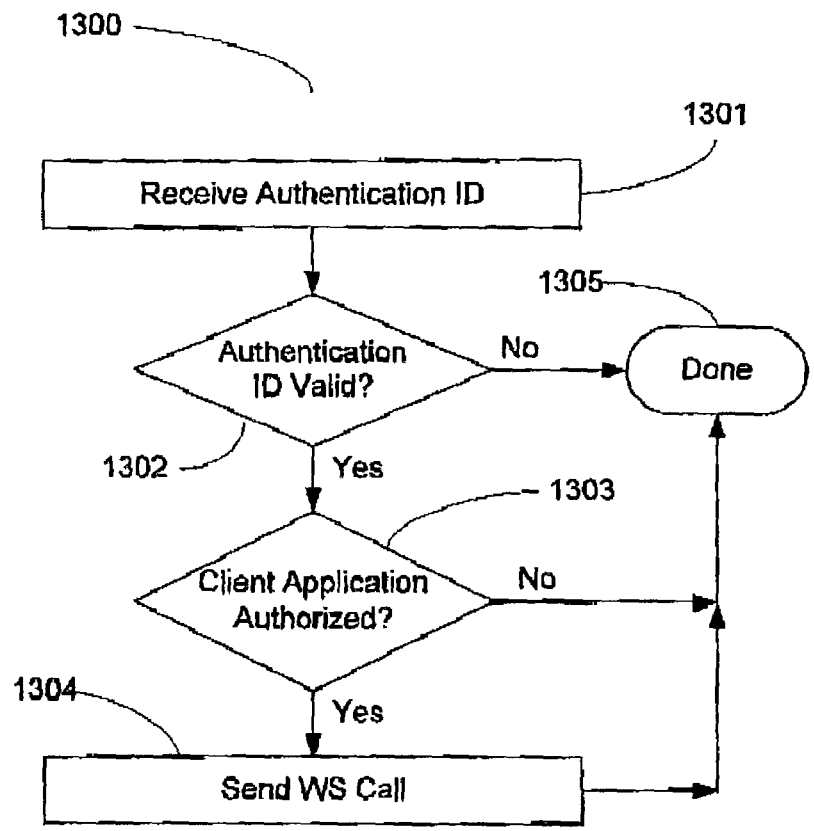
FIG. 13 is a flowchart showing a method for using a pool of authentication identifiers in accordance with an embodiment of the present invention.

FIG. 13 shows a method for using a pool of authentication IDs. During subsequent client calls 701 over an unsecured channel such as http, an authentication ID from the pool of authentication IDs is sent as a parameter in the client calls 701. The client application interface unit 310 receive a client call 701 containing the authentication ID (1301). The authentication ID is parsed from the client call 701 by the communication processor 311, as described above, and passed to the authentication ID validator 945. If the authentication ID is not valid (1302), then the client call 701 is rejected and the method is done (1305). If the authentication ID is valid (1302), then the next step is to check whether the client application 15 is authorized to access the web service method relating to the client call 701 (1303). If the client application 15 is not authorized (1303), then the client call 701 is rejected and the method is done (1305). If the client application 15 is authorized (1303), then the WS call 702 is sent (1304), as described above, and the method is done (1305).

Figure 14:
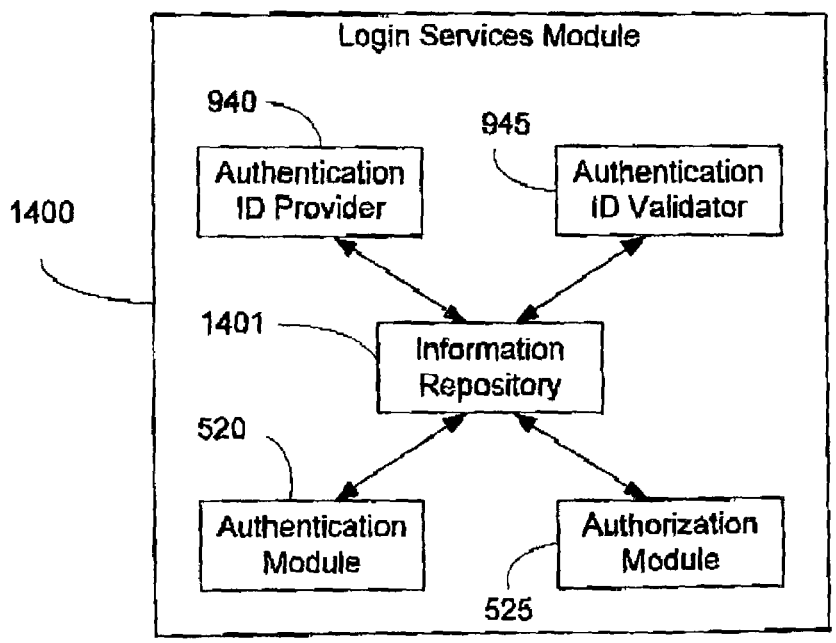
FIG. 14 is a diagram showing another example of a login services module in accordance with an embodiment of the present invention.

FIG. 14 shows another example of a login services module 1400 in accordance with an embodiment of the present invention. The login services module 1400 may be used by the gateway module 900. The login services module 1400 comprises an authentication ID provider 940, an authentication ID validator 945, an authentication module 520, an authorization module 525, and an information repository 1401. The authentication module 520, authorization module 525, authentication ID provider 940 and authentication ID validator 945 are similar to those described above. The information repository 1401 contains information used to authenticate and authorize client applications 15, as well as storing authentication ID allocations. The information repository 1401 may be a database. The authentication ID provider 940, authentication ID validator 945, authentication module 520, and authorization module 525 are connected to the information repository 1401 and may be accessed by the communication processor 311.

Alternatively, the repository 1401 may be accessed by components of the gateway module 900, including the metering module 950 and the billing module 970. Client applications 15 may be charged for the pool of authentication IDs based upon the size of the pool of authentication IDs. Packages of authentication IDs may be available for a client application 15 to order. For example, a client application 15 may order a basic package of 100 authentication IDs, or a premium package of 1000 authentication IDs. Other sizes of packages may be preset. A client application 15 may also be prompted by the authentication ID provider to enter the number of authentication IDs in the pool of authentication IDs.

Alternatively, the billing module 970 may charge based upon use of an authentication ID. In such a scenario, the metering module 950 tracks and records usage of the pool of authentication IDs. The information collected by the metering module 950 is stored in the repository 1401, or another central repository which may be accessed by components of the gateway module 900.

Figure 15:
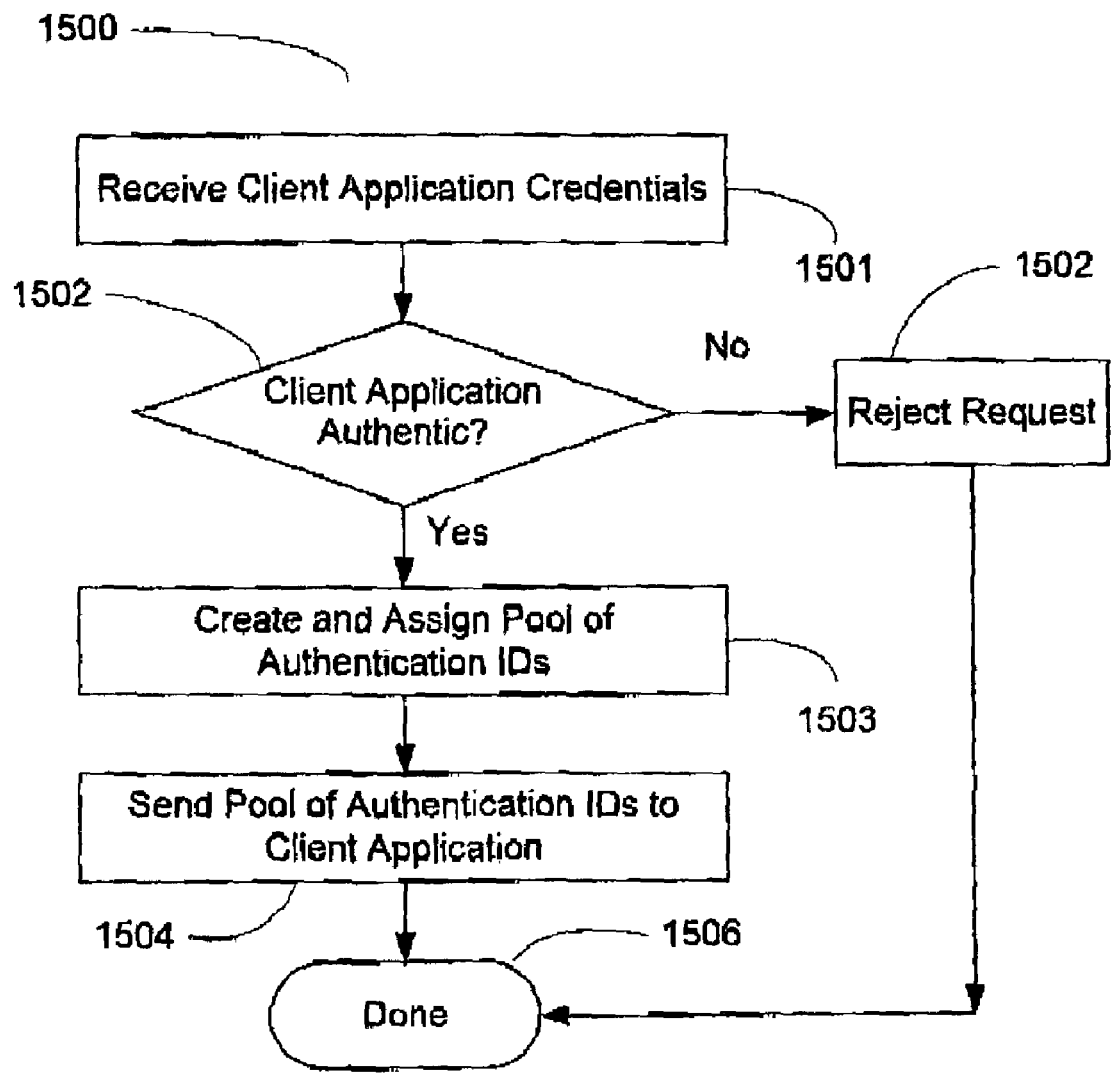
FIG. 15 is a flowchart showing another method for providing a pool of authentication identifiers in accordance with an embodiment of the present invention.

FIG. 15 shows a method for providing a pool of authentication IDs (1500) for use in web services communication. The method begins with the login module 1400 receiving a request for a pool of authentication IDs from a client application 15. Specifically, the login services module 1400 receives client application credentials from the client application interface unit 310 which receives the request over a secured channel (1501). The client application credentials are passed to the authentication module 520 to authenticate the client application 15 (1502). The authentication module 520 may reference the information repository 1401 when authenticating the client application 15. If the client application 15 is not authentic (1502), i.e., the client application credentials are incorrect, then the request will be rejected (1505). If the client application 15 is authentic (1502), then the request is passed to the authentication ID provider 940. The authentication ID provider 940 creates and assigns a pool of authentication IDs and sends the pool of authentication IDs to the client application interface unit 310 to send to the client application 15 (1503) over a secured channel. The pool of authentication IDs may be parameters passed as parameters by the client application 15 when invoking client calls 701. The authentication IDs may be created and assigned by code in the authentication ID provider 940. Alternatively, a bank of authentication IDs may be stored in the information repository 1401 to be assigned by the authentication ID provider 940. The client application 15 is sent the pool of authentication IDs (1504) and the method is done (1506). The client application 15 may now use the pool of authentication IDs. Other steps may be added to the method (1500), such as billing users using client applications 15 or web service providers 20, for the authentication IDs or the use of authentication IDs. As described above, client applications 15 may be billed based upon the amount of authentication IDs in the pool of authentication IDs. Furthermore, the usage of the authentication IDs may be tracked and metered for billing client applications 15 on a per use basis.

The assignment of the pool of authentication IDs may be registered in the information repository 1401. Alternatively, the assignment of the pool of authentication IDs may be registered with the authentication ID validator 945. The registration of the pool of authentication IDs may be in the form of a file containing the assigned pool of authentication IDs, their status, such as used and not used, and client application credentials information, such as the user name and password. Other information may be added to the registration file as desired. The registration file may be referenced by the authentication ID validator 945 when the client application 15 uses each authentication ID.

One aspect of the gateway module 900 relates to the field of dynamic application programming interface (API) and type reflection as well as dynamic modification of these API and types used. Another aspect of the gateway module 900 relates to the authentication of a client application 15 to gain access to the web services 25 that are hosted by the remote server.

Another aspect of the gateway module 900 pertains to the field of web services hosting, monitoring and administration. Preferably, the gateway module 900 is independent from the platforms on which the web services 25 are hosted. Furthermore, the gateway module 900 is independent from the protocol used to access the web services 25. A further aspect of the gateway module 900 pertains to the field of billing and authorization of web services 25.

Figure 16:
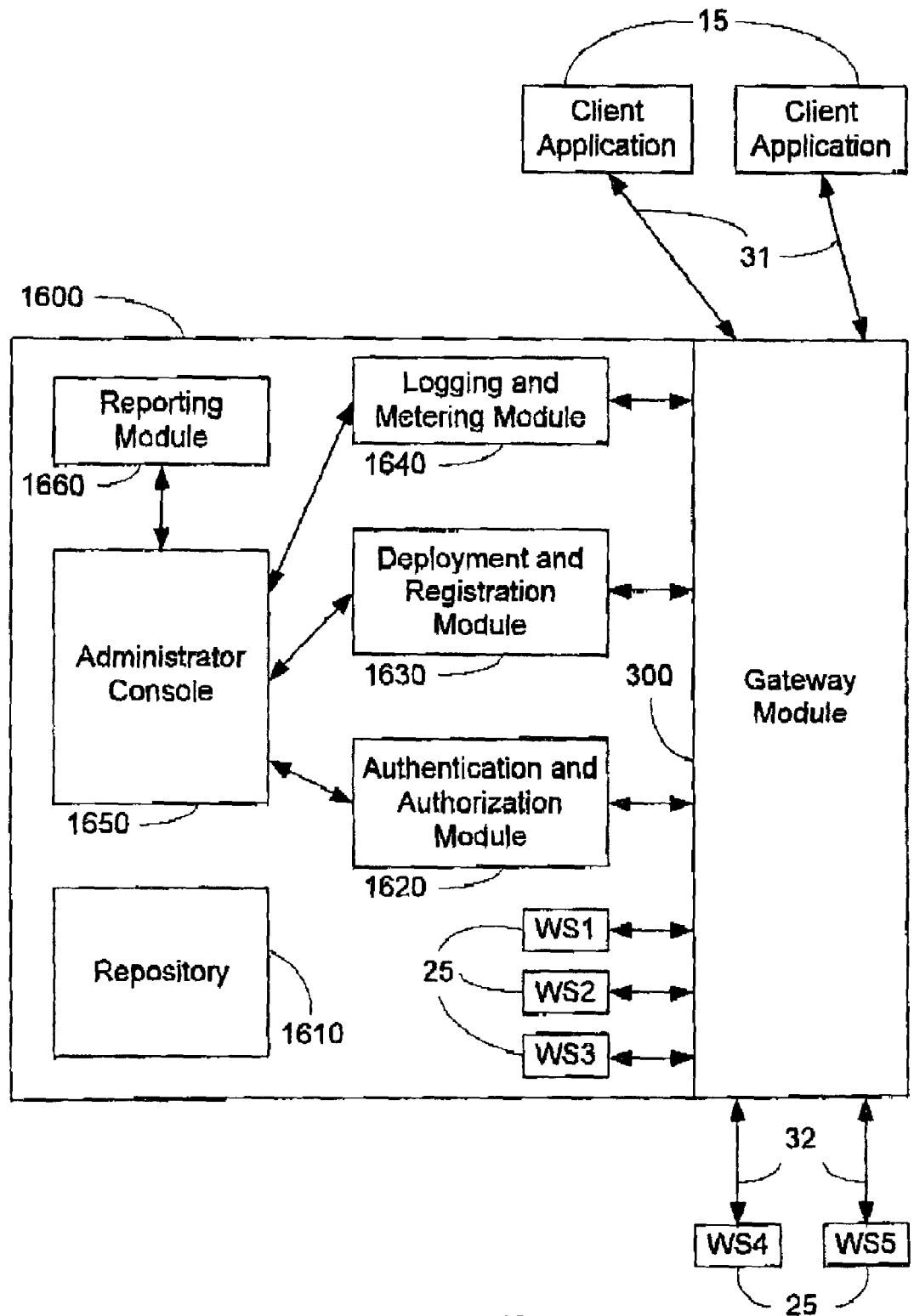
FIG. 16 is a diagram showing an enhanced web service deployment environment in accordance with an embodiment of the invention.

FIG. 16 shows an example of enhanced web service deployment environment 1601 using the gateway module 300. The environment 1601 comprises client applications 15, an internal web services management system 1600, and remote web services 25. The internal web services management system 1600 comprises a repository 1610, an authentication and authorization module 1620, a deployment and registration module 1630, a logging and metering module 1640, an administrator console 1650, a reporting module 1660, a gateway module 300, and local web services 25. Components may be added or removed from the internal web services management system 1600.

FIG. 16 shows licensed web service client applications 15 interacting with the web service gateway module 1650 through a single entry point, the gateway module 300. Communication from a client application 15, such as calls for WSDL or SOAP messages, are intercepted by the gateway module 300. The communication are authenticated and authorized using the authentication and registration module 1620. As the SOAP calls are being made, they are logged for auditing, metering and billing purposes by the logging and metering module 1640. The metering module 1640 records events that take place that can later be used for analysis. A client of the logging and metering module 1640 is the administrator console 1680 that enables the administrator of the web services management system 1600 to track how the system 1600 has been used. Statistics may also be generated and stored in the repository 1610 in order to help the administrator make business decisions such as offering new services, adjusting prices, and other business decisions relating to the packaging of web services.

The gateway module 300 delegates the authorized requests to the actual web service 25, which may be either hosted locally or on remote systems. The reporting module 1660 generates reports on the usage for billing and auditing purposes. The deployment and registration module 1630 registers local and remote web services 25 with the gateway module 300. There is also an administrator console 1650 that is used to perform administration tasks, including provisioning users, setting or modifying access rights, generating reports, and other tasks desired for administration purposes. Finally, the repository 1610 is used to store information desired and accessible by components of the internal web services management system 1600. The repository 1610 may be a database. The components of the internal web services management system 1600 may be software code or code embedded in hardware.

Alternatively, the components of the internal web services management system 1600 may be components added to a gateway module 300, 500, 900.

With another aspect of the gateway module 900, a mechanism is described for returning a web service contract to a third-party client application developer, which is tailored to that specific developer, who, in turn, can tailor that contract to different end users of that client application 15. This increased flexibility is made possible by adding a layer above the web services 25, such that the developer of those web services, hereby referred to as the web service developer, does not need to be concerned with the process of limiting access to third-party developers, who are programmatic consumers of the web services 25, or to end users. This extra layer, referred to as the gateway module 300, 500, 900, can provide this flexibility at two different points in time, one during development and the other at run-time.

In the web service commerce model, each web service provider 20 hosts a set of web services 25 either to be consumed over the web by an application publisher, which in turn caters to the end user (i.e., consumer), or another web services provider 20. The other web service provider 20 may bind to those web services 25 across the Internet, aggregate the web services 25 with their own set of web services 25, or build upon the web services 25 to provide more sophisticated web services 25 of their own. Therefore, a chain of producer-consumer relationships exists between the client application 15 and suppliers of the lowest level web services 25. The scenario can be contrasted with the traditional web application model, which is client-server oriented, operating between the web browser on the end user side and an application hosted on a particular web site.

Figure 17:
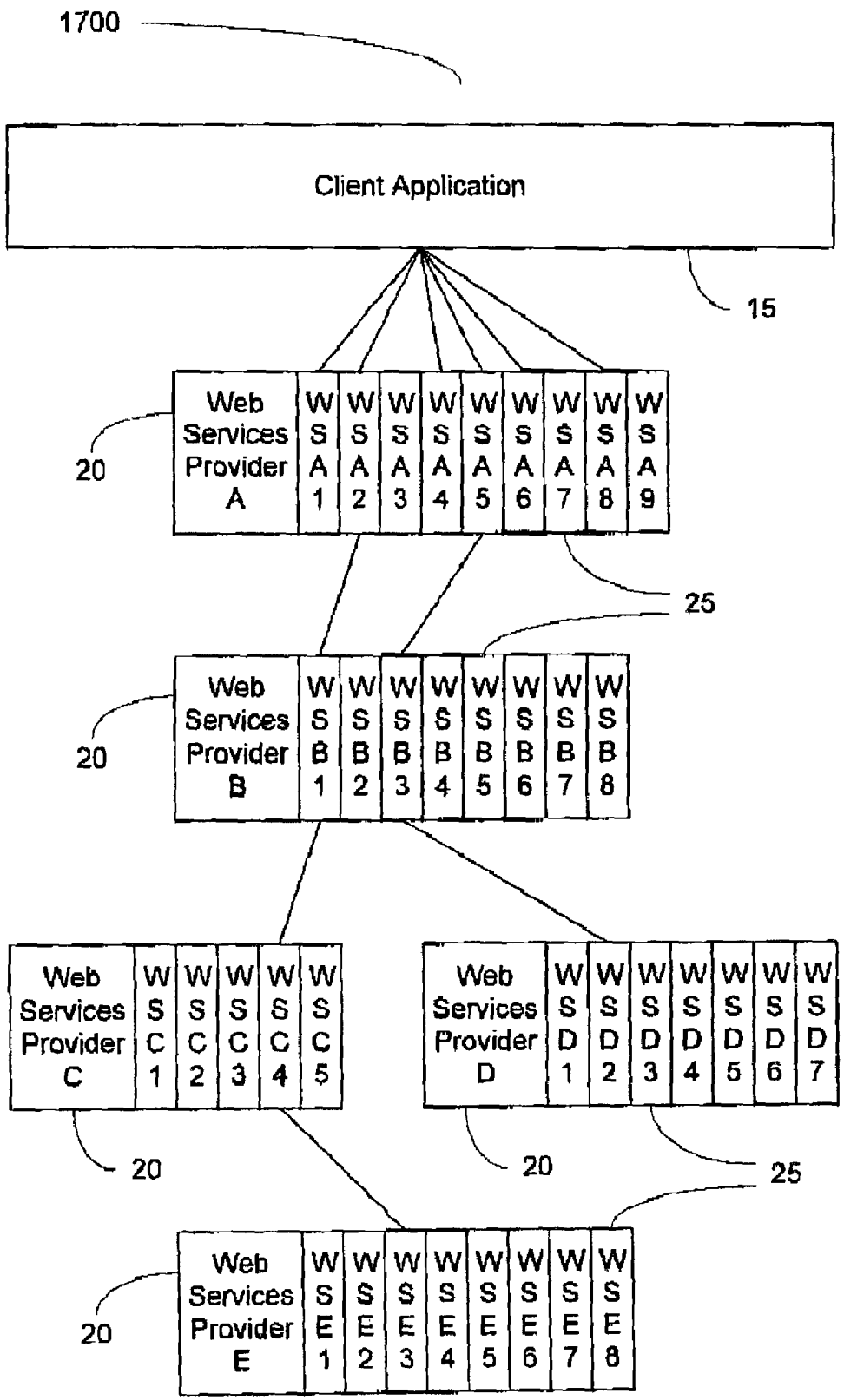
FIG. 17 is a diagram showing a supply chain of producer-consumer relationships between a client application and the lowest level web services.

FIG. 17 shows an example of a supply chain 1700 of producer-consumer relationships between the client application 15 and web services providers 20. The supply chain 1700 comprises a client application 15, web services providers A-E 20, and web services A1-A9, B1-B8, C1-C5, D1-D7, and E1-E8 25. The client application 15 uses web services A1, A2, A4, A5, A6 and A8 25. In order to supply web services A2 and A5 25, web services provider A uses web services B1 and B3 25, respectively, from web services provider B 20. In order to supply web service B1 25, web services provider B 20 uses web service C4 25 from web services provider C 20. In order to supply web service B3 25, web services provider B 20 uses web service D3 25 from web services provider D 20. In order to supply web service C4 25, web services provider B 20 uses web service E3 25 from web services provider E 20.

Each party in the supply chain 1700 would perceivably have similar concerns. For example, each might want to keep a database of its users, whether private or corporate, and authenticate, authorize and bill them accordingly. Since the technology for hosting of web services 25 is relatively new, currently each entity in the supply chain implements their own business logic to handle the aforementioned concerns.

The following is a summary of how a web service infrastructure 501, 1601 provides a chain of producer-consumer relationships, according to an embodiment of the invention. The gateway module 300, 500, 900 caters to the common hosting, monitoring and administrative needs of entities in the web service supply chain. This embodiment concerns the manner in which the gateway module 300, 500, 900 is architected and deployed. The embodiment includes four features.

One feature is that the web services infrastructure 201, 501, 1601 includes one single logically coherent entity (the gateway module 300, 500, 900) through which communication between client applications 15 and hosted web services 25 are routed. Tightly associated with it is any logic that requires an understanding of how to handle events that occurred within the web services 25. The centralization of this logic is desirable to provide a comprehensive solution for the web service provider 20.

Consider a typical scenario where the provider 20 needs to authenticate and authorize the client 15, log any events that occur during any access, delegate the request to the appropriate web service 25 as necessary and log any events that occur during the process. At the least, an event infrastructure should be provided to all modules of which the infrastructure is aware, so that events can be sent and that the infrastructure is aware of any module that need to be notified of events. For example, the billing module 970 is notified in the event that a web service 25 is being accessed in order to do its job; and the authorization module 525 might want to notify that a login has failed. The modules should either directly or indirectly be able to communicate with each other. In an implementation where no such centralized infrastructure exists, it is difficult to add modules that need to be notified of events. Thus a comprehensive solution is not be practical without a centralized infrastructure, such as the web services infrastructure 201, 501.

Another feature is that the gateway module 300, 500, 900 is able to support off-the-shelf web services 25 as-is without need for adaptation. This is achieved by monitoring low-level requests that comes through, executing necessary logic and finally delegating to the appropriate web service. This is beneficial to both web service providers 20 and web service authors, as they do not have to adapt their logic in order for the services to be hosted, administered and monitored.

Yet another feature is that the gateway module 300, 500, 900 is capable of masking the interfaces, addresses and service description of each web service 25 to appear different to client applications 15, which are able to access the web services 25 as advertised in a transparent manner.

The masquerading of interface and service description is desirable to allow the web service provider 20 is to be able to rename web services functionalities and add parameters to their list of formal arguments. This capability is particularly desirable for authentication and authorization purposes. For example, the provider may want to assign the client an authentication ID that once authenticated, requires the client to access web service functions (or methods) with the authentication ID. Here the gateway module 300, 500, 900 disguises these web service functions as having an extra authentication ID parameter.

The masquerading of web service addresses serves the above purposes. Another effect is that it allows the service provider 20 to transparently aggregate services offered by another web service provider 20 as though it is one of its own.

A fourth feature is that the gateway module 300, 500, 900, along with all the accompanying functionality, is scalable across multiple processing units, and state data can be persisted across multiple requests. This is achieved by having a thread-safe data store. Thus, in one example of a gateway 900, all of the data in the entire system, including the web service registry 530, the web method registry, the authorization tables, the billing tables which indicate how to bill clients, the actual billing data which indicate the details of a bill, potentially the authentication tables (users/passwords), potentially the authentication ID to user mappings, and the audit logs are kept in a thread-safe data store, such as the repository 1610. There is no state information in any of the modules of the gateway module 900 as all state is effectively kept in this data store. This feature is an implementation detail of how the various modules accomplish their intent.

The gateway module 300, 500, 900 enables the production of a homogeneous, comprehensive and extendable solution that will work for parties in a web service distribution framework. The gateway 300, 500, 900, can recursively service a chain of web services providers 20.

Another problem that arises from providing web services 25 is that in order to create revenues, the web services 25 must also incorporate billing of the client applications 15, auditing of all transactions that occur, administration of client applications 15 and billing schemes and any other common functionality that arises from the fact that a web service 25 is being sold to a client application 15. For example, each web service provider 20 can host any number of web services 25. Each web service provider 20 can contain any number of functions (or methods), which can potentially be billed in a different manner. Service providers 20 might wish to tailor billing and authorization schemes for each function to its client applications 15. Therefore, the permutation of user to billing/authorization pairs to be maintained can be large.

There are many complexities regarding billing and authorization. Each billing and authorization method can take on any number of parameters. For example, a pay per use billing scheme can be tagged with any price. Groups of functions, perhaps across web services 25, might only make sense to be billed and authorized the same way. For example, blur image effect filters published by different companies and distributed across different web services 25. Billing schemes can vary across time and temporal cycles. For example, a web service provider 20 might want to charge more during busy hours. Authorization may be independent of billing schemes. For example, an administrator might want to temporarily deny a user from accessing certain functions. However, the billing scheme should remain effective once the restriction is lifted. Finally, some billing methods are intrinsically tied to authorization. For example, the client might pay $100 to use a given web service function one hundred times. Afterwards, the web service 25 will have to become unavailable.

Billing schemes may be created such that a billing module in the web services management system 1600 (or the billing module 970 in the gateway module 900) requires information regarding which web services methods a client application 15 has used. Such information is tracked by the logging and metering module 1640 (or the metering module 950) and stored in the repository 1610 (or a central repository of the gateway module 900). Alternatively, the logging and metering module 1640 (or the metering module 950) may pass the web services methods usage information directly to the billing module (or billing module 970) to be used or stored for later use.

The following description will refer to web services management systems 1600. However, the authorization schemes portion of the following description also applies to the gateway module 900.

A web service comprises one or more methods which users or client applications may invoke. Different web services may have a different amount of methods. In embodiments of the gateway module 300, 500, 900, web services are registered with a central repository. Identifications of the methods of the web services are stored in the repository and grouped into bundles. A bundle of methods contains one or more methods from one or more web services. For example, consider four web services where a first web service contains 10 methods, a second web service contains 20 methods, a third web service contains 100 methods, and a fourth web service contains 50 methods. A bundle may be created to contain one method which belongs to the first web service, two methods which belong to a second web service, and six methods which belong to a fourth web service. Another bundle may be created to contain six methods which belong to the first web services, 11 methods which belong to the second web service, 71 methods which belongs to the third web service, and all 50 methods which belong to the fourth web service. Other combinations of methods belonging to a plurality of web services containing a plurality of methods may be created.

Figure 18:
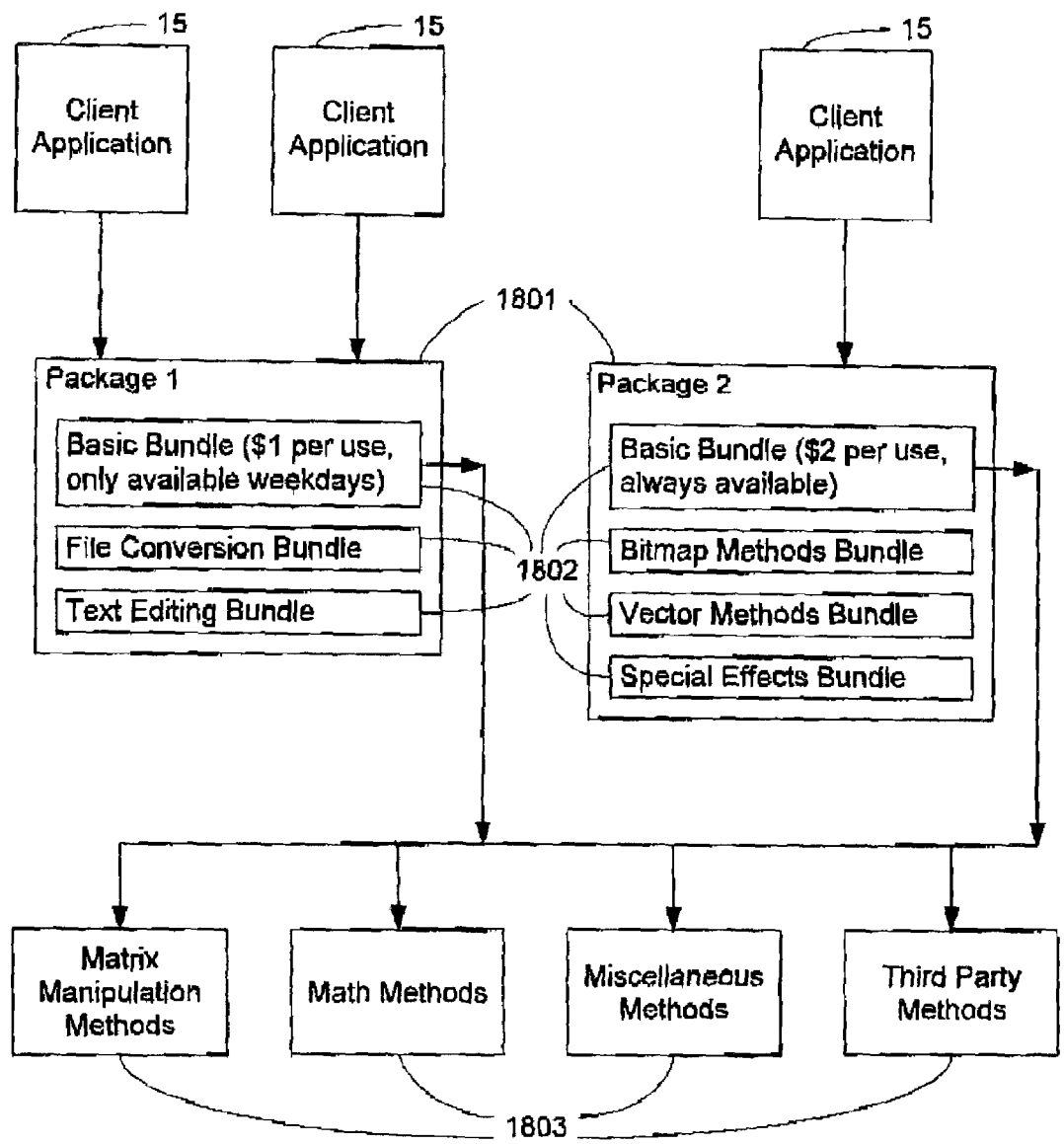
FIG. 18 is a diagram showing bundling on a per-client application basis in accordance with an embodiment of the present invention.

With reference to FIG. 18, the following describes how the web services management system 1600 is used to package web services. FIG. 18 shows client applications 15 assigned to packages 1801 comprising of bundles 1802. The bundles 1802 comprise web services methods or routines 1803 which a client application 15 may use when calling web services methods 1803. In this example, the basic bundle 1802 contains matrix manipulation, math, miscellaneous, and third party web services methods 1803.

Web services methods are registered in the repository 1610 (or a central repository in the gateway module 900). The web services methods are then grouped into bundles 1802. Client applications 15 may also register with the web services management system 1600. Client applications 15 usage rights relating to the bundles are stored in the repository 1610. Thus, by accessing the repository 1610 to determine if a client application 15 has usage rights to a bundle, the authentication and authorization module 1620 determines if a client application 15 is authorized to access a web services method in that bundle.

The bundles 1802 are grouped into packages 1801. The web services methods 1803 of bundles 1802 are billed and authorized in the same manner within the same package 1801. For example, Package 1 contains a basic bundle, a file conversion bundle, and a text editing bundle. Package 2 contains a basic bundle, a bitmap methods bundle, a vector methods bundle, and a special effects bundle. Other packages 1801 containing other combinations of bundles 1802 may be created.

Advantageously, providing web services functionality through packages 1801 eliminates much of the logistics needed to manage/present billing and authorization requirements. Tables or records in the repository 1610 may contain a listing of methods 1803 of all web services registered with the web services management system 1600. Methods 1803 of different web services may be organized together into a bundle 1802.

Packages 1801 organize bundles 1802 into default billing/authorization plans to which client applications 15 may subscribe. The same bundle can reside in different packages 1801, with different billing/authorization specifications. In the example shown in FIG. 18, the basic bundle is contained in both packages 1801.

A client application 15 may only subscribe to one package 1801. This limitation advantageously reduces the logistics since allowing a client application to subscribe to more than one package 1801 may create a potential scenario of the two packages 1801 both containing the same bundle 1802 (or even different bundles 1802 with the same methods) but associated with a different billing/authorization plan. For example, the basic bundle in Package 1 is priced at $1 per use and is limited to use on weekdays. The basic bundle in Package 2 contains the same web services methods the basic bundle in Package 1. However, there are no limitations to availability for the basic bundle in Package 2 and therefore, a price of $2 per use is assigned to Package 2.

In one example of a billing scheme, a web service administrator can override the default billing/authorization plan specified in the package 1801 to which a client application 15 subscribes. Advantageously, this allows for further flexibility for billing client applications 15.

Billing and/or authorization schemes may be created to vary depending on the time of day, day of the week, week of the month, etc. Alternatively, billing/authorization may expire after a set amount of time has passed since the package 1801 was assigned to the client application. For example, a client application may sign up for a trial package of web services that allows the client application to use the services for a trial period, like a month, after which access will expire. Thus, the system 1600 may be designed to be aware of time and temporal cycles using time stamps as to when the client application signed up, the server clock, and other means of measuring time available to the server upon which the web services management system 1600 is implemented.

The logging and metering module 1640 and authentication and authorization module 1620 modules may employ a plug-in architecture which allows new components to be easily added without changing the core architecture. There are several ways in which this plug-in archetecture can be accomplished. One example provides that the core architecture would search a particular location on the server, in which the web services management system 1600 is implement, for the existence of billing/authorization schemes. Since the architecture can be designed to always search the same location, additional schemes can be added. For example, other bundles 1802 may be added to a package 1801, or other web services methods 1803 may be added to a bundle 1802.

The determination of a client application's permissions to use a given resource may depend on the current standing of the client application's billing data. For example, if a client application's billing type specifies that the client application has paid a certain fee which allows the client application to make X number of calls to a bundle of methods, then on the (X+1)th call that client application will not be authorized to make the call. To achieve this, the authentication and authorization module 1620 may query the logging and metering module 1640, or the logging and metering module 1640 may set some state in the authentication and authorization module 1620.

Figure 19:
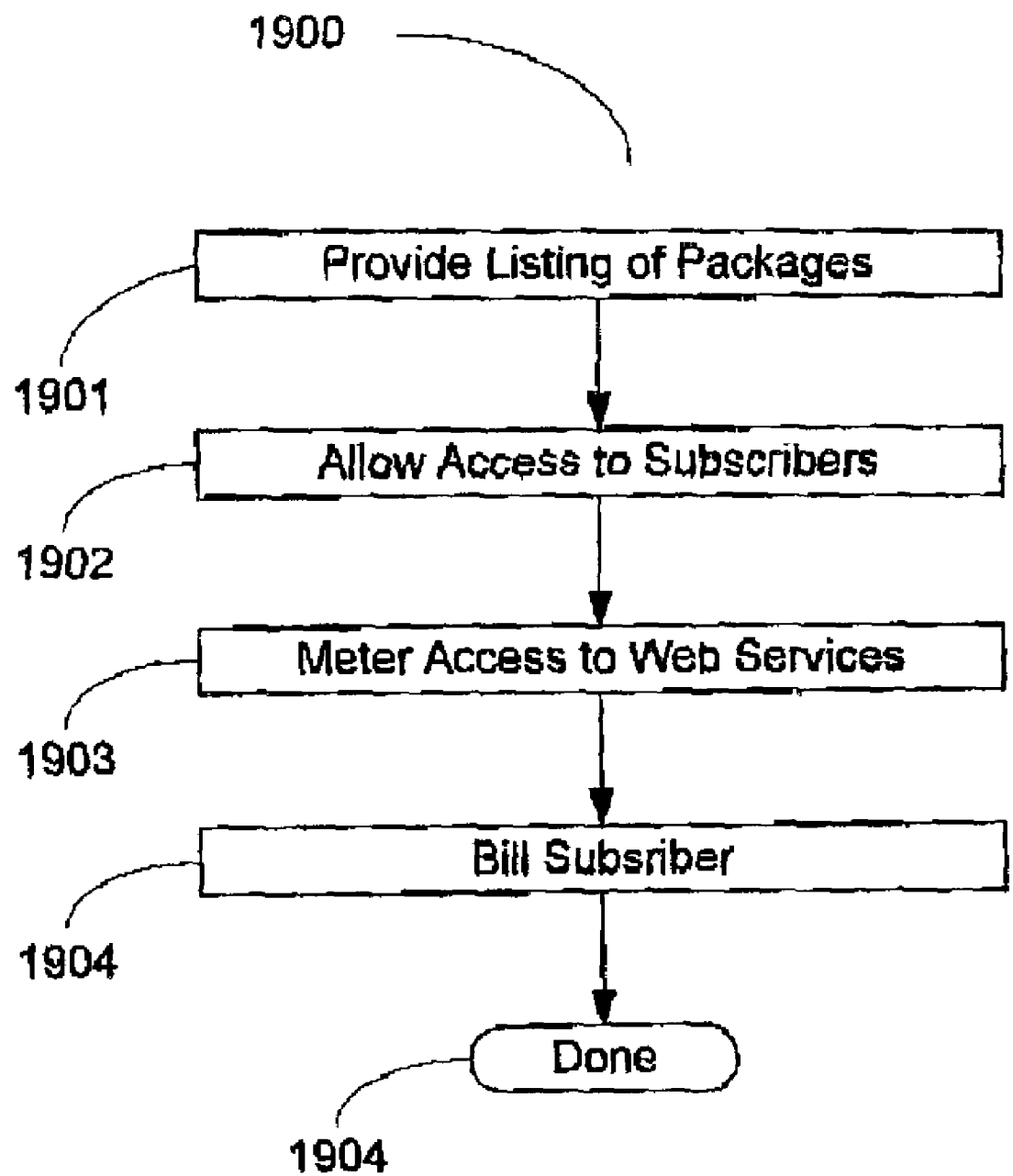
FIG. 19 is a flowchart showing a method for billing and authorization of web services in accordance with an embodiment of the present invention.

FIG. 19 shows a method for billing and authorization of web services (1900) in accordance with an embodiment of the present invention. The method (1900) begins with providing a listing of web service functionality (i.e., a listing of packages 1801) to which a client application 15 may subscribe (1901). Subscribed client applications are given access to method calls 1803 of web services contained in bundles 1802 of a package 1801 to which they are a subscriber (1902). Access to web services method calls 1803 contained in the bundles 1802 is metered (1903). The web services usage is billed pursuant to the billing scheme of the package 1801 (1904). The method is done (1905).

Other steps may be added to the method (1900), such as registering a web service with the web services management system 1600, registering a client application 15 with the web services management system 1600, and storing in the repository 1610 the web services and the client applications 15 which are authorized to access the web services methods 303.

The web services infrastructure 501, 1601 creates value directly to the web services provider 20, in that it specifically addresses the need for a web service hosting architecture described above. It could similarly address this problem for any company that wants to develop and host a collection of web services 25.

Of notable advantage is the fact that the web services 25 making use of the gateway module 300, 500, 900 do not have to be designed with its use in mind. Any SOAP service can be used with the web services infrastructure 501. Furthermore neither the web services 25 nor the clients 15 are aware the gateway module 300, 500, 900, lies between them. In this regard, the system 300, 500, 900 is transparent. Since the system 300, 500, 900 is built on the SOAP and XML standards, it will remain viable going forward as web services 25 and their usage continue to evolve.

The purpose and practical use of the gateway module 300, 500, 900, is that it be deployed on the servers which host a company's web services 25. The web services 25 are registered with the web service registry repository 530 and an administrator may set up user rights, billing schemes and any other infrastructure for these services.

The gateway module 300, 500, 900, or web services management system 1600, provides value to the web services provider 20, in that it allows for the tailoring of functionality on a per-client application basis. The alternative would be to develop different versions of its web services 20 for different customers, thus requiring duplication of code and additional strains on disk space, to maintain multiple copies of similar code. The gateway module 300, 500, 900, provides the framework around which the web services provider 20 can track usage of the web services 25 and charge accordingly, on a per-client application basis.

The gateway module 300, 500, 900, is also designed for scalability and portability, in the sense that it can be sold as a separate product, to be run on the third-party developer's server, to allow the third-party developer to restrict access to the end users who are running the application 15 consuming the web services 25 or the third-party developer's own web services 25.

The pool of authentication IDs is valuable to the end user since they will know that nobody can misuse their authentication ID and make use of the web service 25 that they are paying for. It is also good for the web services provider 20 or host, since web service access will be more secure which may be a requirement to gain contracts with certain clients. The pool of authentication IDs may be used independently from the gateway module 300, 500, 900.

The gateway module 300, 500, 900, makes possible the implementation of a comprehensive solution for web service providers 20 by serving their web service hosting, monitoring and administration needs. The web service infrastructure 201, 501, 1601 is applicable to any party in the chain 1400 of web service providers 20. This lowers development, distribution, maintenance and support cost for the web services provider or host, which will pass on to the web service providers 20.

The ability of the web service infrastructure to abstract away web service addresses and signatures provides web service providers with high degrees of flexibility on how the web services are to be managed and presented to the end users, who in turn benefit from interfaces that are presented in a well-organized manner.

The ability of the web service infrastructure to aggregate services provided by external entities promotes software reuse and collaboration between web service providers. Since the web service infrastructure is scalable across multiple processing units, web service providers gain addition deployment flexibility, and invest in hardware only as needed.

The gateway module 300, 500, 900, provides an elegant, comprehensive and extendable system for handling the most complex of web services 25 billing and authorization scenarios. To web services providers 20, the gateway module 300, 500, 900, means reduced administration, resource and upgrade costs. To the end users, the gateway module 300, 500, 900, opens up the possibility of finely customized billing and authorization options.

The gateway module 300, 500, 900, is not dependent on the transport layer. The gateway 300, 500, 900, performs authentication through the payload, i.e., parameters in SOAP messages. With the gateway module 300, 500, 900, client applications 15 do not have any direct contact with web services provider 20. Since the web services provider 20 is not exposed to client applications 15, advantageously web services providers 20 of the registered web services 25 in the gateway module 300, 500, 900, do not have to implement authentication.

The gateway module 300, 500, 900, according to the present invention may be implemented by any hardware, software or a combination of hardware and software having the above described functions. The software code, either in its entirety or a part thereof, may be stored in a computer readable memory. Further, a computer data signal representing the software code which may be embedded in a carrier wave may be transmitted via a communication network. Such a computer readable memory and a computer data signal are also within the scope of the present invention, as well as the hardware, software and the combination thereof.

While particular embodiments of the present invention have been shown and described, changes and modifications may be made to such embodiments without departing from the true scope of the invention.

What is claimed is:

1. A gateway module stored in a computer readable storage medium for managing functionality for a plurality of web services, the gateway module comprising:
    a client application interface unit for receiving a communication from a client application over a standard protocol, the communication including a service load request or a contract request, wherein:
    the service request is a request for a web service of the plurality of web services, the service request including authorization information; and
    the contract request is a request for requesting a web service application programming interface (API) contract of the web service;
    a web services interface unit for sending a web service communication to the web service and receiving a corresponding response from the web service, the web service communication comprising a web service request or the contract request wherein:
    web service request is a request for processing by the web service; and
    the corresponding response from the web service comprising a web service response or a contract response wherein:
    the web service response is based on the processing of the web service request; and
    the contract response describing the web service API contract of the web service;
    a communication processor for processing the communication received by the client application interface unit and the web service response received by the web services interface unit, the communication processor having:
    a method call processor for modifying the received service request by removing at least the authorization information to create the web service request sent to the web service; and
    a response processor for modifying the web service API contract of the contract response received from the web service to create a gateway API contract for use by the client application in accessing the web service through the gateway; and
    an authorization module for authorizing the client application to access the web service using at least the authorization information of the service request, the authorization being transparent to the web service.

2. The gateway module as claimed in claim 1, further comprising a centralized repository for storing information relating to the client application and the plurality of web services.

3. The gateway module as claimed in claim 1, wherein the method call processor modifies a simple object access protocol (SOAP) method call received by the client application interface unit.

4. The gateway module as claimed in claim 1, wherein the client application interface unit sends extensible markup language (XML)/simple object access protocol (SOAP) communication to the client application; and
    the web services interface unit receives XML/SOAP communication from the web service.

5. The gateway module as claimed in claim 1, wherein the response processor includes a simple object access protocol (SOAP) response processor for modifying responses to simple object access protocol method calls.

6. The gateway module as claimed in claim 1, wherein the web service API contract is described using web service description language (WSDL).

7. The gateway module as claimed in claim 1, further comprising an authentication module for authenticating the client application, the authentication being transparent to the web service.

8. The gateway module as claimed in claim 1, further comprising a login services module comprising:
    the authorization module; and
    an authentication module for checking the authenticity of the client application, the authentication being transparent to the web service.

9. The gateway module as claimed in claim 8, wherein the login services module further comprises:
    an authentication identifier provider for providing the client application a pool of authentication identifiers for use in subsequent communication with the web service; and
    an authentication identifier validator for checking the validity of an authentication identifier from a pool of authentication identifiers sent with the subsequent communication.

10. The gateway module as claimed in claim 9, wherein each authentication identifier is limited to be used in one communication.

11. The gateway module as claimed in claim 9, wherein the pool of authentication identifiers are provided to the client application through a secured channel.

12. The gateway module as claimed in claim 9, wherein each communication from the client application to the web service containing one of the authentication identifiers is made through an unsecured channel.

13. The gateway module as claimed in claim 1, further comprising a metering module for metering web service usage of the client application, the metering being transparent to the web service.

14. The gateway module as claimed in claim 1, wherein the standard protocol for messaging between the client application and the web service is simple object access protocol (SOAP).

15. The gateway module as claimed in claim 1, wherein the client application is another web service.

16. The gateway module as claimed in claim 1, further comprising a billing unit for billing the client application, wherein the billing unit bills a client application for the use of a package of bundles assigned to the client application, the bundles comprising one or more methods from a plurality of web services.

17. The gateway module as claimed in claim 1, further comprising a logging and metering module for logging and metering the usage of the gateway module by the client application.

18. The gateway module as claimed in claim 1, further comprising:

a repository for storing information relating to methods of a plurality of web services organized into bundles, each bundle having one or more methods from one or more web services; and the authorization module for authorizing a client application to access methods in one of the bundles.

19. The gateway module as claimed in claim 18, wherein at least one bundle has one or more methods from at least two web services.

20. The gateway module as claimed in claim 18, wherein the bundles are organized into packages.

21. A method for managing functionality for a plurality of web services, the method comprising steps of:

receiving at a gateway a contract request for a web service application programming interface (API) contract of the web service of the plurality of web services; sending the contract request to the web service;

receiving at the gateway a web service API contract response comprising an API contract description of the web service;

generating a gateway API contract based on the received web service API contract description;

sending the gateway API contract for use by a client application in accessing the web service through the gateway;

receiving at the gateway a service request from the client application, the service request for processing by the web service and complying with the gateway API contract and including authorization information;

authorizing the client application for using the web service based on the authorization information;

generating a web service request based on the service request received from the client application by removing at least the authorization information; and sending the generated web service request to the web service for processing.

22. The method as claimed in claim 21, further comprising the step of storing information relating to the client application and the web service.

23. The method as claimed in claim 21, wherein the service request received at the gateway is a simple object access protocol (SOAP) method call.

24. The method as claimed in claim 21, further comprising steps of:

receiving extensible markup language (XML)/simple object access protocol (SOAP) communication from the web service; and sending XML/SOAP communication to the client application.

25. The method as claimed in claim 24, further comprising the step of modifying responses to simple object access protocol (SOAP) method calls.

26. The method as claimed in claim 24, wherein the step of generating the gateway API contract includes the step of modifying a web service description language contract.

27. The method as claimed in claim 21, further comprising the step of authenticating the client application, the authentication being transparent to the web service.

28. The method claimed in claim 27, further comprising the steps of:

providing the client application a pool of authentication identifiers for use in subsequent communication with the web service; and checking the validity of an authentication identifier from a pool of authentication identifiers sent with the subsequent communication.

29. The method as claimed in claim 28, further comprising the step of limiting each authentication identifier to be used in only one communication.

30. The method as claimed in claim 28, wherein the step of providing comprises the step of providing the pool of authentication identifiers to the client application through a secured channel.

31. The method as claimed in claim 28, further comprising receiving subsequent communication from the client application to the web service containing one of the authentication identifiers through an unsecured channel.

32. The method as claimed in claim 21, further comprising the step of metering web service usage of the client application, the metering being transparent to the web service.

33. The method as claimed in claim 21, wherein the communications with the client application and the web service use simple object access protocol (SOAP).

34. The method as claimed in claim 21, wherein the client application is another web service.

35. The method as claimed in claim 21, further comprising the step of billing a client application for the use of a package of bundles assigned to the client application, the bundles comprising one or more methods from a plurality of web services.

36. The method as claimed in claim 21, further comprising the step of logging and metering the usage of the gateway module by the client application.

37. The method as claimed in claim 21, further comprising the steps of:

storing information relating to methods of a plurality of web services organized into bundles, each bundle having one or more methods from one or more web services; and authorizing a client application to access methods in one of the bundles.

38. The method as claimed in claim 37, wherein the step of storing comprises storing at least one bundle having one or more methods from at least two web services.

39. The gateway module as claimed in claim 37, further comprising the step of organizing the bundles into packages.

40. A computer readable storage media for storing instructions and/or statements for use in the execution in a computer of a method for managing functionality for a plurality of web services, the method comprising steps of:

receiving at a gateway a contract request for a web service application programming interface (API) contract of the web service of the plurality of web services; sending the contract request to the web service;

receiving at the gateway a web service API contract response comprising an API contract description of the web service;

generating a gateway API contract based on the received web service API contract description;

sending the gateway API contract for use by a client application in accessing the web service through the gateway;

receiving at the gateway a service request from the client application, the service request for processing by the web service and complying with the gateway API contract and including authorization information;

authorizing the client application for using the web service based on the authorization information;

generating a web service request based on the service request received from the client application by removing at least the authorization information; and sending the generated web service request to the web service for processing.

41. A computer program product stored in a computer readable storage medium for use in the execution in a computer of a method for managing functionality for a plurality of web services, the method comprising:

receiving at a gateway a contract request for a web service application programming interface (API) contract of the web service of the plurality of web services;

sending the contract request to the web service;

receiving at the gateway a web service API contract response comprising an API contract description of the web service;

generating a gateway API contract based on the received web service API contract description;

sending the gateway API contract for use by a client application in accessing the web service through the gateway;

receiving at the gateway a service request from the client application, the service request for processing by the web service and complying with the gateway API contract and including authorization information;

authorizing the client application for using the web service based on the authorization information;

generating a web service request based on the service request received from the client application by removing at least the authorization information; and sending the generated web service request to the web service for processing.

\* \* \* \* \*

UNITED STATES PATENT AND TRADEMARK OFFICE
CERTIFICATE OF CORRECTION

PATENT NO. : 7,640,348 B2  Page 1 of 1
APPLICATION NO. : 10/252871
DATED : December 29, 2009
INVENTOR(S) : Atwal et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 989 days.

Signed and Sealed this

Twenty-first Day of December, 2010

David J. Kappos
*Director of the United States Patent and Trademark Office*